(12) United States Patent
Suda

(10) Patent No.: US 12,737,864 B2
(45) Date of Patent: Sep. 15, 2026

(54) INSPECTION SYSTEM

(71) Applicant: CANON KABUSHIKI KAISHA, Tokyo (JP)

(72) Inventor: Takeyuki Suda, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 246 days.

(21) Appl. No.: 18/588,481

(22) Filed: Feb. 27, 2024

(65) Prior Publication Data

US 2024/0296538 A1 Sep. 5, 2024

(30) Foreign Application Priority Data

Mar. 3, 2023 (JP) ................................ 2023-033072

(51) Int. Cl.
*G06T 7/00* (2017.01)

(52) U.S. Cl.
CPC .. *G06T 7/0002* (2013.01); *G06T 2207/10004* (2013.01); *G06T 2207/10024* (2013.01); *G06T 2207/30176* (2013.01)

(58) Field of Classification Search
CPC .... G06T 7/0002–0016; H04N 1/00002–00092
See application file for complete search history.

(56) References Cited

U.S. PATENT DOCUMENTS

2014/0168709 A1* 6/2014 Tokumaru ............... G06T 7/001 358/1.18
2015/0221077 A1* 8/2015 Kawabata ............... G06T 7/337 382/141
2019/0139220 A1* 5/2019 Akiyama ............. H04N 1/0408
2021/0304384 A1* 9/2021 Nakada .............. H04N 1/00087
2023/0297297 A1* 9/2023 Ishikawa ........... H04N 1/00074 358/1.15

(Continued)

FOREIGN PATENT DOCUMENTS

CN 102780827 A 11/2012
CN 104982026 A 10/2015

(Continued)

OTHER PUBLICATIONS

Extended European Search Report issued in European Appln. No. 24158609.8 dated Jun. 19, 2024.

(Continued)

*Primary Examiner* — Sean T Motsinger
(74) *Attorney, Agent, or Firm* — ROSSI, KIMMS & McDOWELL LLP

(57) ABSTRACT

An inspection system includes a reading unit that reads a sheet on which a target image is formed to generate read image data, an inspection unit that inspects the target image by comparing the read image data with a reference image data at an inspection level configured from among candidate levels to generate a first inspection result, and a control unit that causes a display apparatus to display an inspection result. In a case where the first inspection result meets a predetermined condition, the control unit causes the display apparatus to display the first inspection result and to display a second inspection result. The second inspection result is obtained by inspecting the target image at one or more candidate levels that are different from the inspection level.

13 Claims, 15 Drawing Sheets

(56) References Cited

U.S. PATENT DOCUMENTS

2023/0350615 A1 * 11/2023 Kitai ....................... G06T 7/001

FOREIGN PATENT DOCUMENTS

| | | | |
|---|---|---|---|
| CN | 105354281 | A | 2/2016 |
| CN | 113746995 | A | 12/2021 |
| CN | 116805297 | A | 9/2023 |
| JP | 2007148027 | A | 6/2007 |
| JP | 2009230047 | A | 10/2009 |
| JP | 2011257186 | A | 12/2011 |
| JP | 2016177669 | A | 10/2016 |
| JP | 2020093425 | A | 6/2020 |
| JP | 2021187085 | A | * 12/2021 |
| JP | 2022170678 | A | 11/2022 |

OTHER PUBLICATIONS

Communication Pursuant to Article 94(3) EPC issued in European Appln. No. 24158609.8 mailed Jul. 28, 2025.

Office Action issued in Chinese Appln. No. 202410213227.8 mailed Jul. 16, 2026.

* cited by examiner 1
10
20
50
70
100
101
110
115
120
121Y
121M
121C
121K
122
123
124
125
126
127
128
131
132
133
134
135
136
137
140
141
150
151
152
153
154
155
170
171
172
180
181
182
183
200
250
R F I G. 2
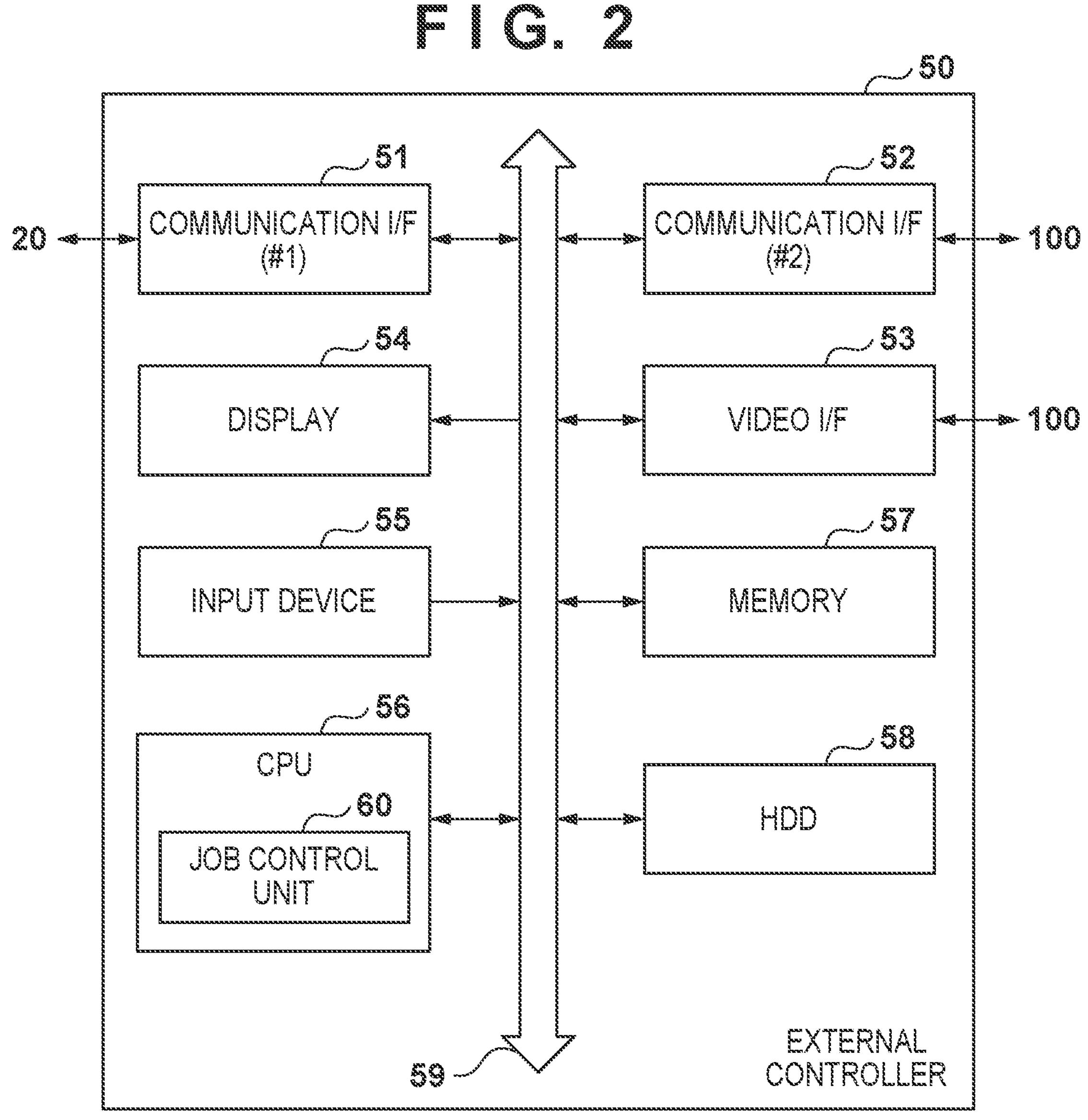

F I G. 3
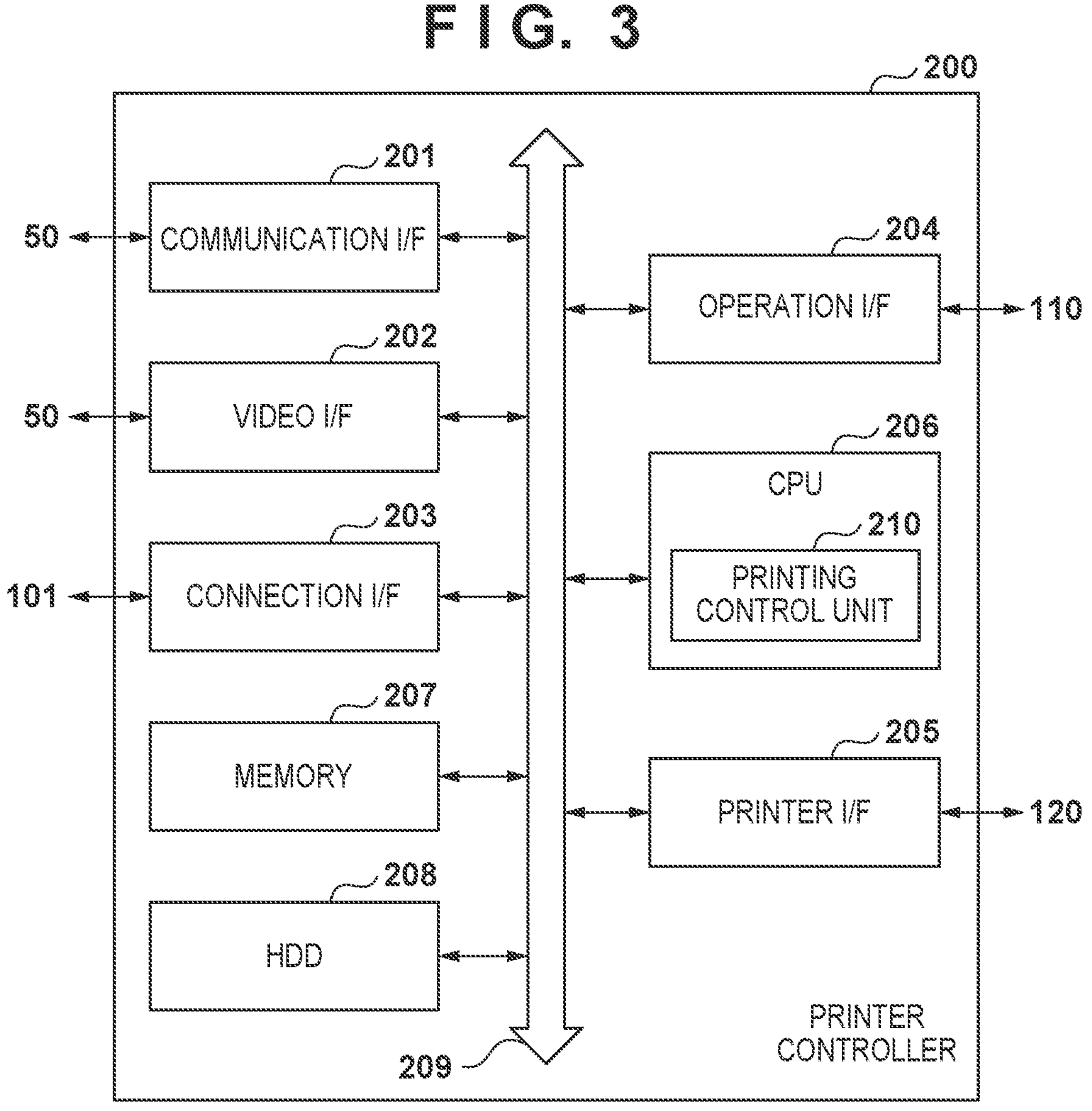

F I G. 4
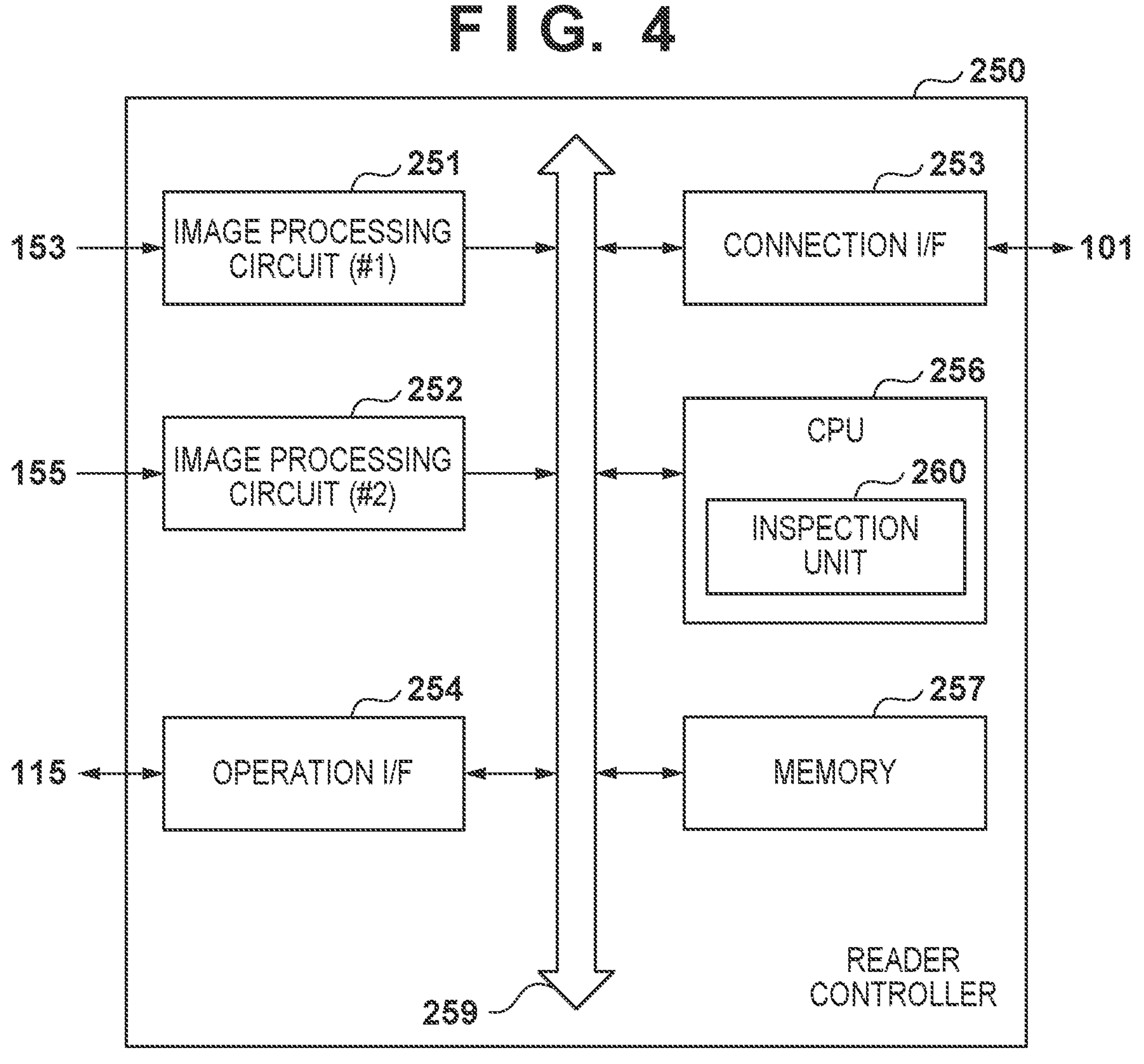

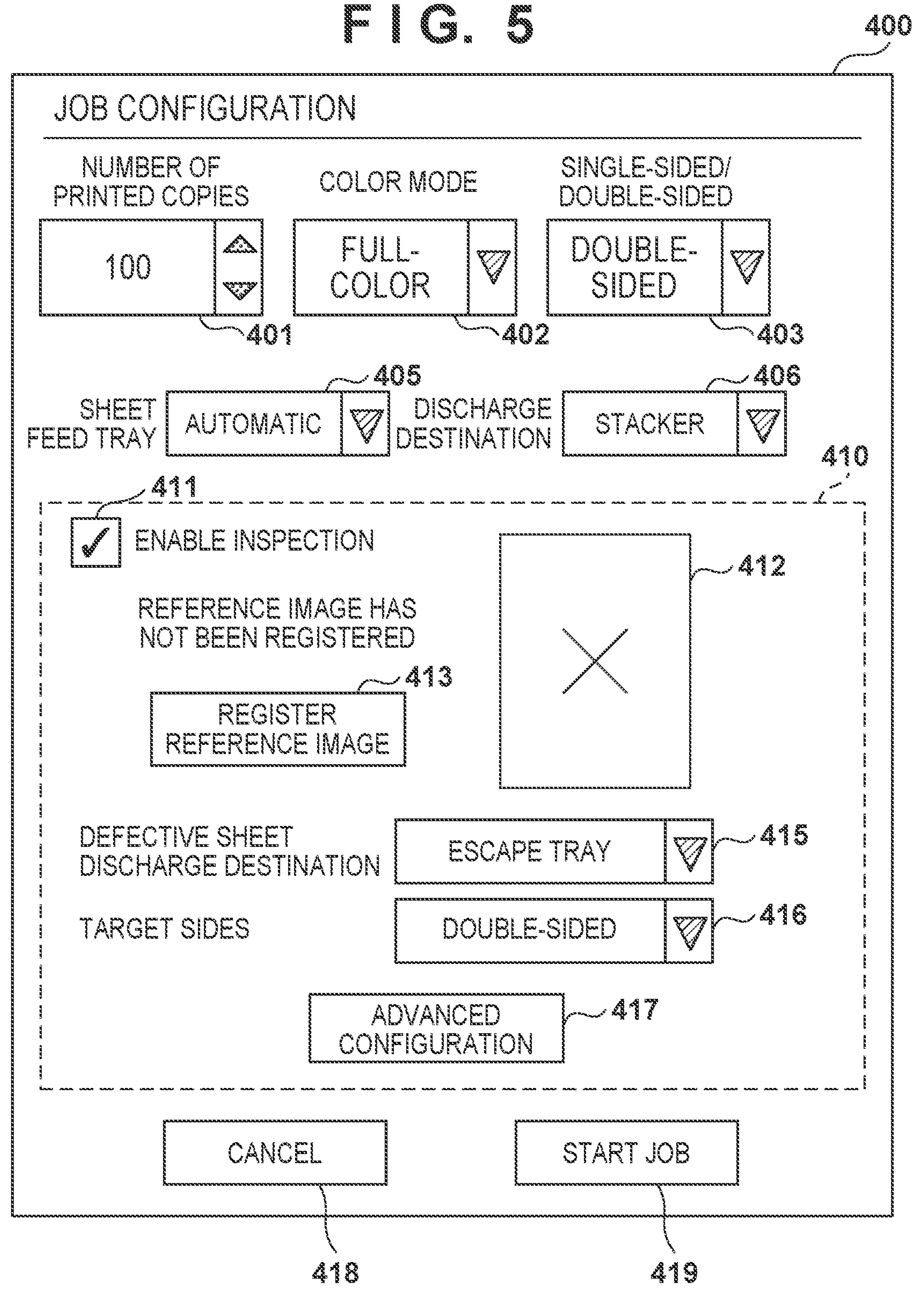

F I G. 5
400
JOB CONFIGURATION
NUMBER OF PRINTED COPIES
COLOR MODE
SINGLE-SIDED/ DOUBLE-SIDED
100
FULL-COLOR
DOUBLE-SIDED
401
402
403
405
406
SHEET FEED TRAY
AUTOMATIC
DISCHARGE DESTINATION
STACKER
410
411
ENABLE INSPECTION
412
REFERENCE IMAGE HAS NOT BEEN REGISTERED
413
REGISTER REFERENCE IMAGE
DEFECTIVE SHEET DISCHARGE DESTINATION
ESCAPE TRAY
415
TARGET SIDES
DOUBLE-SIDED
416
ADVANCED CONFIGURATION
417
CANCEL
START JOB
418
419

F I G. 6
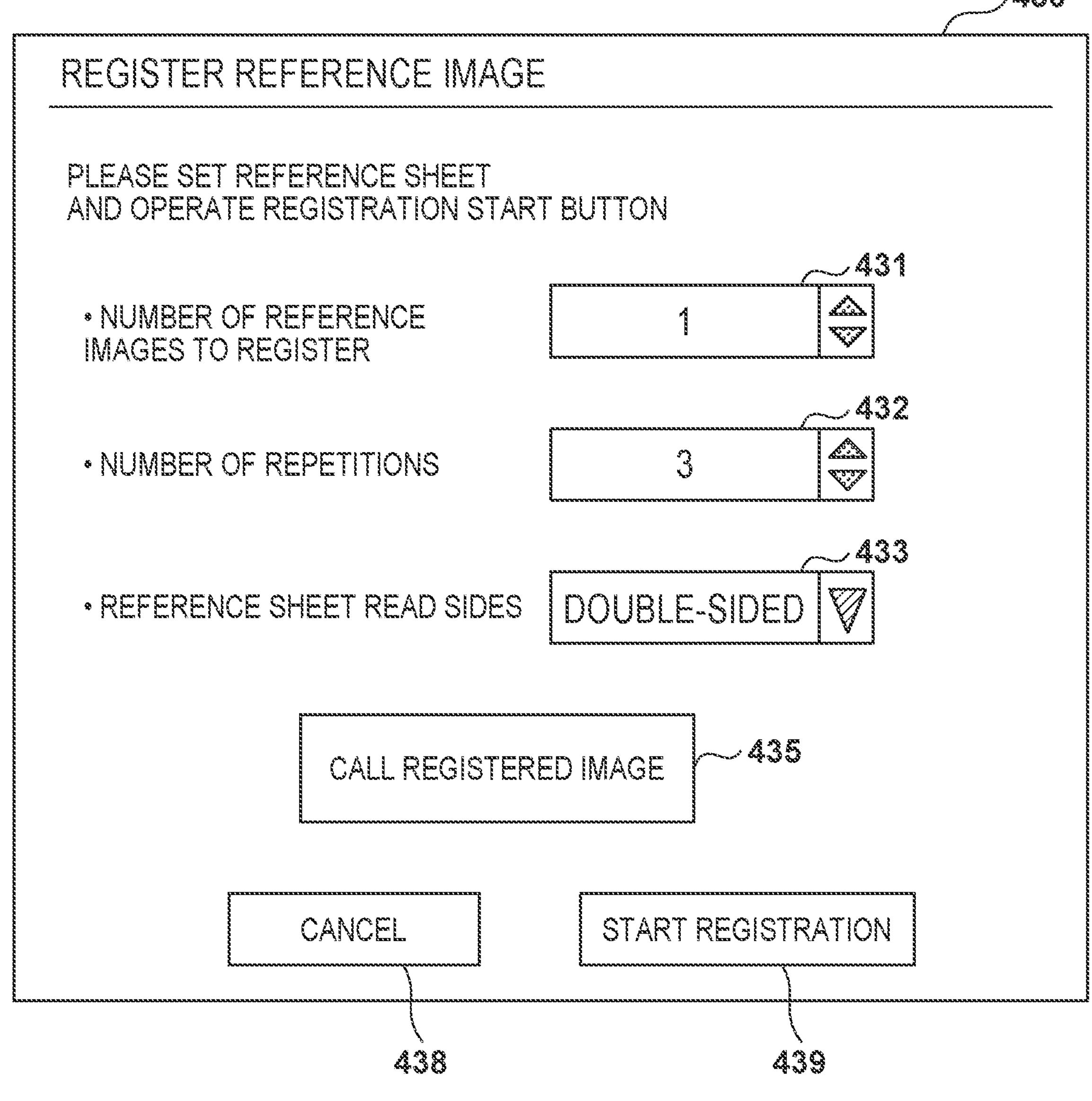

FIG. 7

F I G. 10
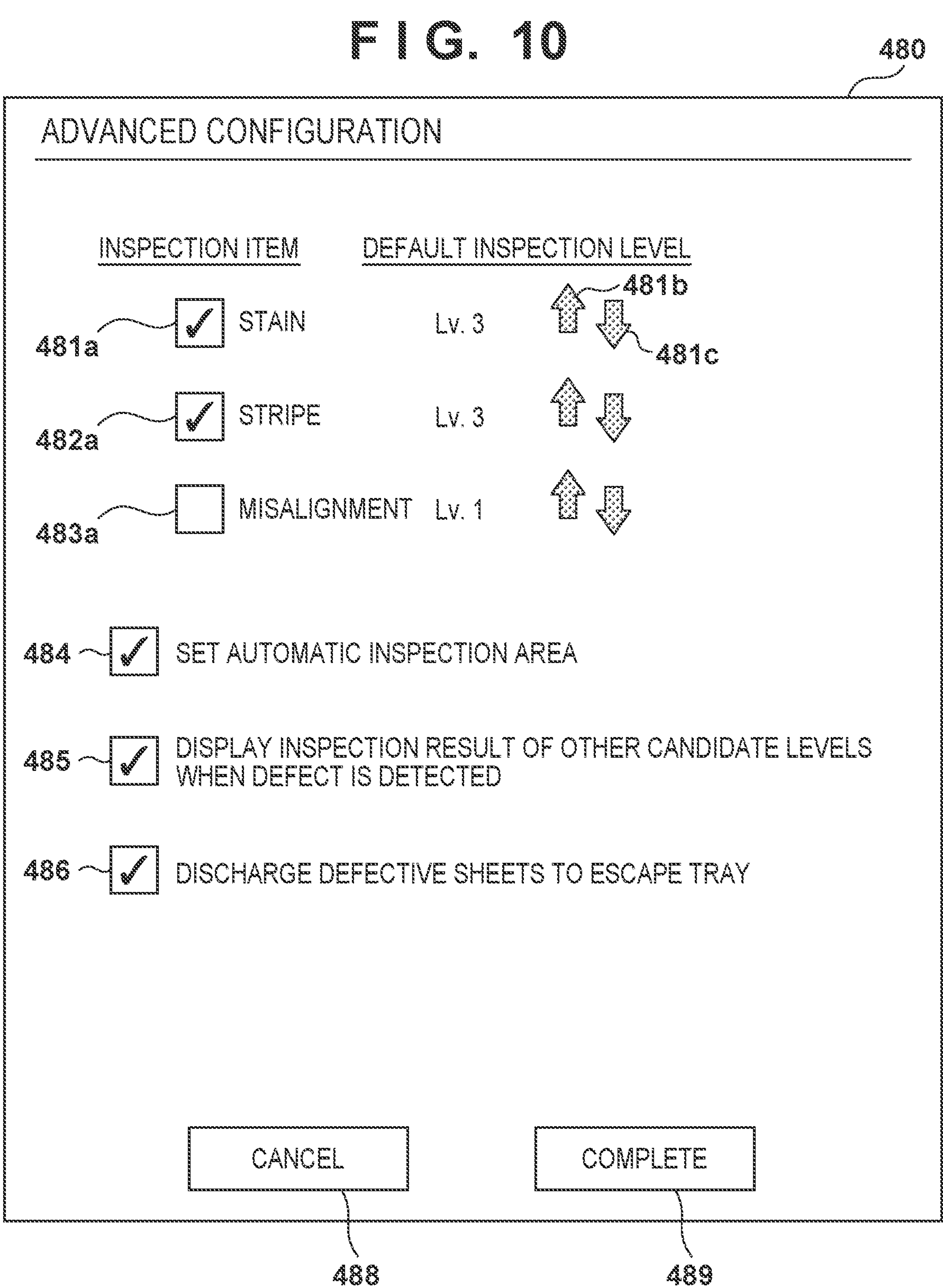

INSPECTING ...

89TH COPY - Page 1/3

491

492

INSPECTION RESULT:
NORMAL

STOP INSPECTION

SUSPEND PRINTING

Figure 13:
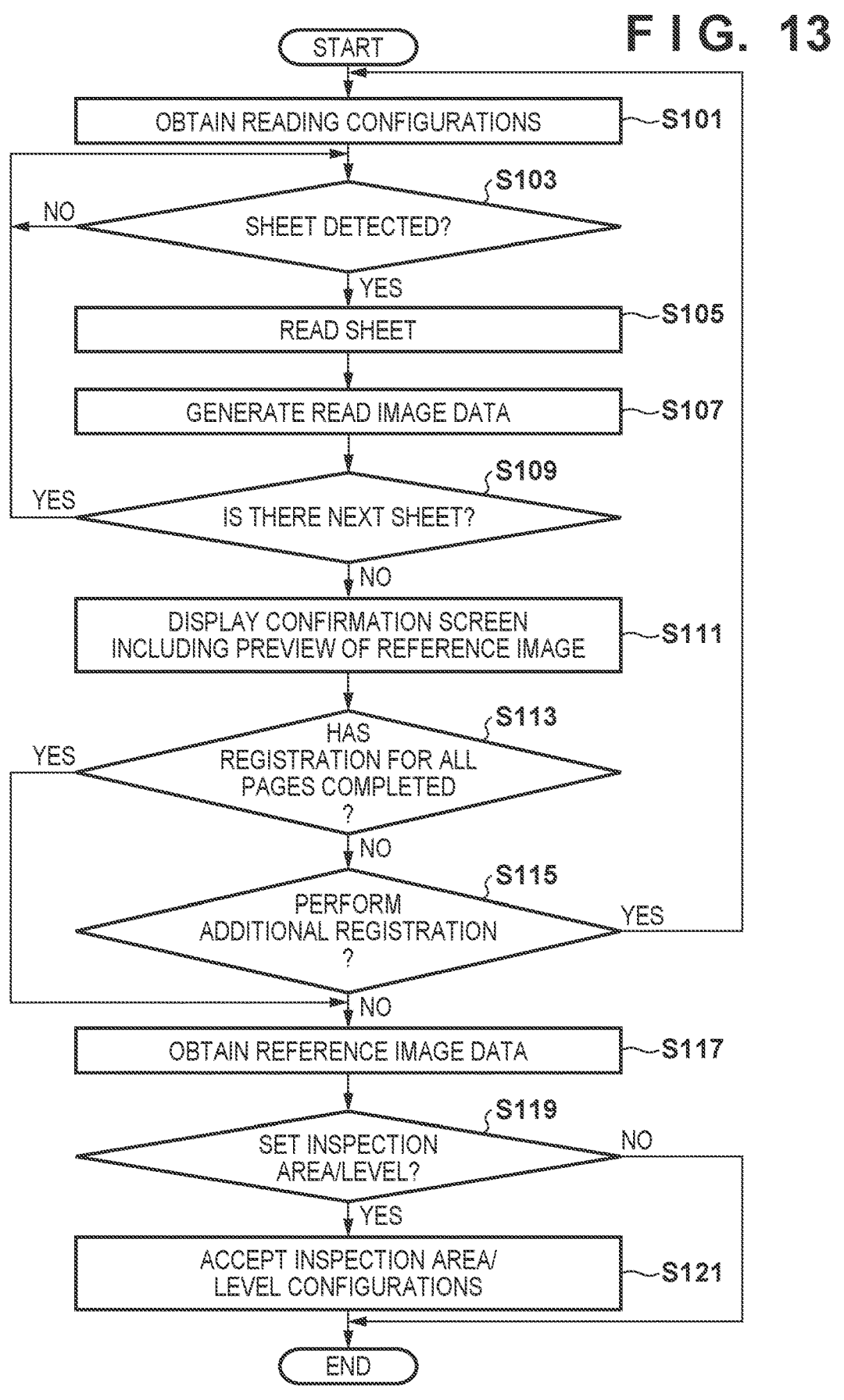

START
S101 OBTAIN READING CONFIGURATIONS
S103 SHEET DETECTED? (NO: return to S103; YES: go to S105)
S105 READ SHEET
S107 GENERATE READ IMAGE DATA
S109 IS THERE NEXT SHEET? (YES: return to S103; NO: go to S111)
S111 DISPLAY CONFIRMATION SCREEN INCLUDING PREVIEW OF REFERENCE IMAGE
S113 HAS REGISTRATION FOR ALL PAGES COMPLETED ? (YES: go to S117; NO: go to S115)
S115 PERFORM ADDITIONAL REGISTRATION ? (YES: return to S101; NO: go to S117)
S117 OBTAIN REFERENCE IMAGE DATA
S119 SET INSPECTION AREA/LEVEL? (YES: go to S121; NO: go to END)
S121 ACCEPT INSPECTION AREA/ LEVEL CONFIGURATIONS
END

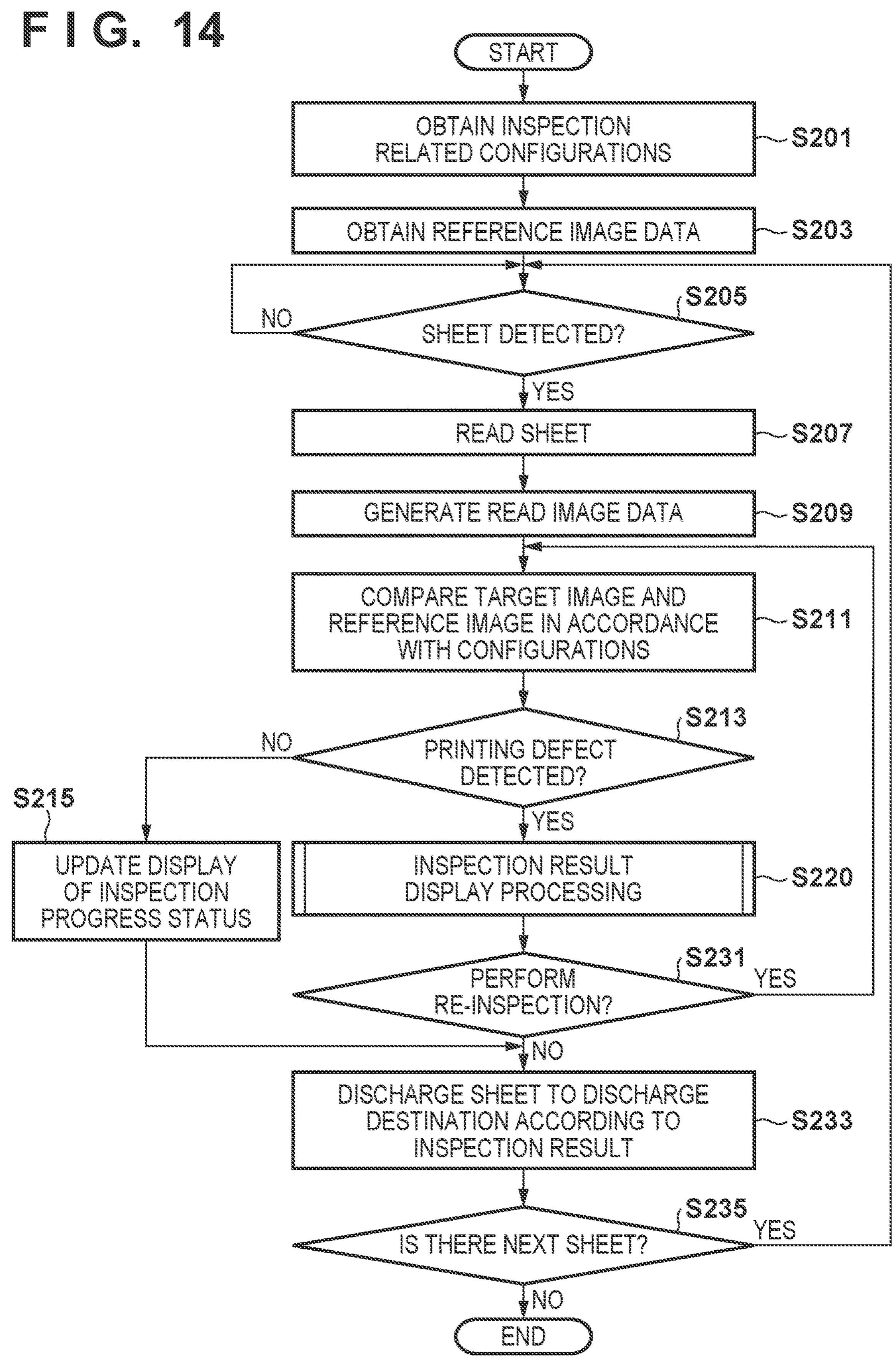
F I G. 14
START
OBTAIN INSPECTION RELATED CONFIGURATIONS
S201
OBTAIN REFERENCE IMAGE DATA
S203
S205
NO
SHEET DETECTED?
YES
READ SHEET
S207
GENERATE READ IMAGE DATA
S209
COMPARE TARGET IMAGE AND REFERENCE IMAGE IN ACCORDANCE WITH CONFIGURATIONS
S211
S213
NO
PRINTING DEFECT DETECTED?
YES
S215
UPDATE DISPLAY OF INSPECTION PROGRESS STATUS
INSPECTION RESULT DISPLAY PROCESSING
S220
S231
PERFORM RE-INSPECTION?
YES
NO
DISCHARGE SHEET TO DISCHARGE DESTINATION ACCORDING TO INSPECTION RESULT
S233
S235
IS THERE NEXT SHEET?
YES
NO
END F I G. 15
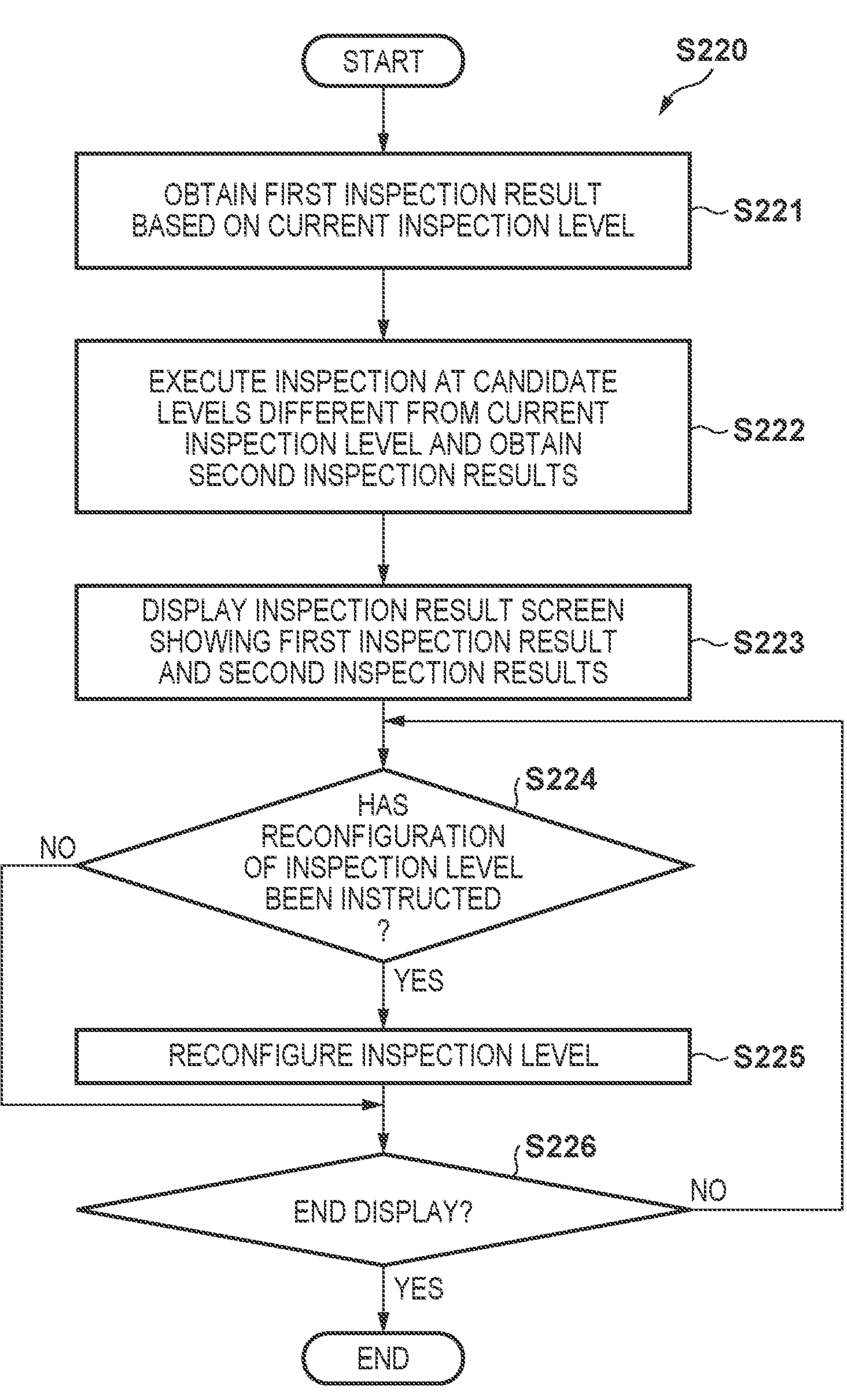

INSPECTION SYSTEM

BACKGROUND OF THE INVENTION

Field of the Invention

The present disclosure relates to an inspection system that inspects an image on a sheet.

Description of the Related Art

A conventional inspection system is known in which a sheet on which an image has been formed by a printer is read by a scanner disposed in stage after the printer, and the read image is then analyzed to inspect the quality of the image on the sheet.

For example, Japanese Patent Laid-Open No. 2021-187085 discloses a technique in which, when comparing read image data corresponding to an inspection target image with reference image data, whether the images match is determined at inspection levels which differ from inspection area to inspection area.

SUMMARY OF THE INVENTION

The extent to which a user can tolerate image defects depends on various factors such as the purpose of the printed product, costs, productivity, and the like. The user may not always be able to configure an optimal inspection level before the start of printing and inspection. If the inspection level is configured to be too high, the number of sheets determined to be defective despite being within a permissible range will rise. On the other hand, if the inspection level is configured to be too low, defects which should be detected will be more likely to be missed. If an undesirable inspection result is output, the user can change the inspection level configuration and instruct the printing and inspection again, but it has been difficult for users to know how the inspection level should be changed.

In view of the foregoing circumstances, the present invention aims at improving usability at the time of configuring an inspection level for inspecting an image on a sheet.

According to one aspect, there is provided an inspection system including: a reading unit configured to read a sheet on which a target image is formed to generate read image data; an inspection unit configured to inspect the target image by comparing the read image data with a reference image data at an inspection level configured from among a plurality of candidate levels to generate a first inspection result; and a control unit configured to cause a display apparatus to display an inspection result. In a case where the first inspection result meets a predetermined condition, the control unit is configured to cause the display apparatus to display the first inspection result, and to display a second inspection result. The second inspection result is obtained by inspecting the target image at one or more candidate levels that are different from the inspection level from among the plurality of candidate levels.

Further features of the present invention will become apparent from the following description of exemplary embodiments (with reference to the attached drawings).

BRIEF DESCRIPTION OF THE DRAWINGS

FIG. 2 is a block diagram illustrating an example of a configuration of an external controller according to an embodiment.

FIG. 3 is a block diagram illustrating an example of a configuration of a printer controller according to an embodiment.

FIG. 4 is a block diagram illustrating an example of a configuration of a reader controller according to an embodiment.

FIG. 5 is an explanatory diagram illustrating an example of a configuration of a job configuration screen.

FIG. 6 is an explanatory diagram illustrating an example of a configuration of a reference image registration screen.

FIG. 7 is an explanatory diagram illustrating an example of a configuration of a reference image confirmation screen.

FIG. 10 is an explanatory diagram illustrating an example of a configuration of an advanced configuration screen.

FIG. 11 is an explanatory diagram illustrating an example of a configuration of an inspection status screen.

FIG. 13 is a flowchart illustrating an example of a flow of reference image registration processing.

FIG. 14 is a flowchart illustrating an example of a flow of inspection processing.

FIG. 15 is a flowchart illustrating an example of a detailed flow of inspection result display processing.

DESCRIPTION OF THE EMBODIMENTS

Figure 1:
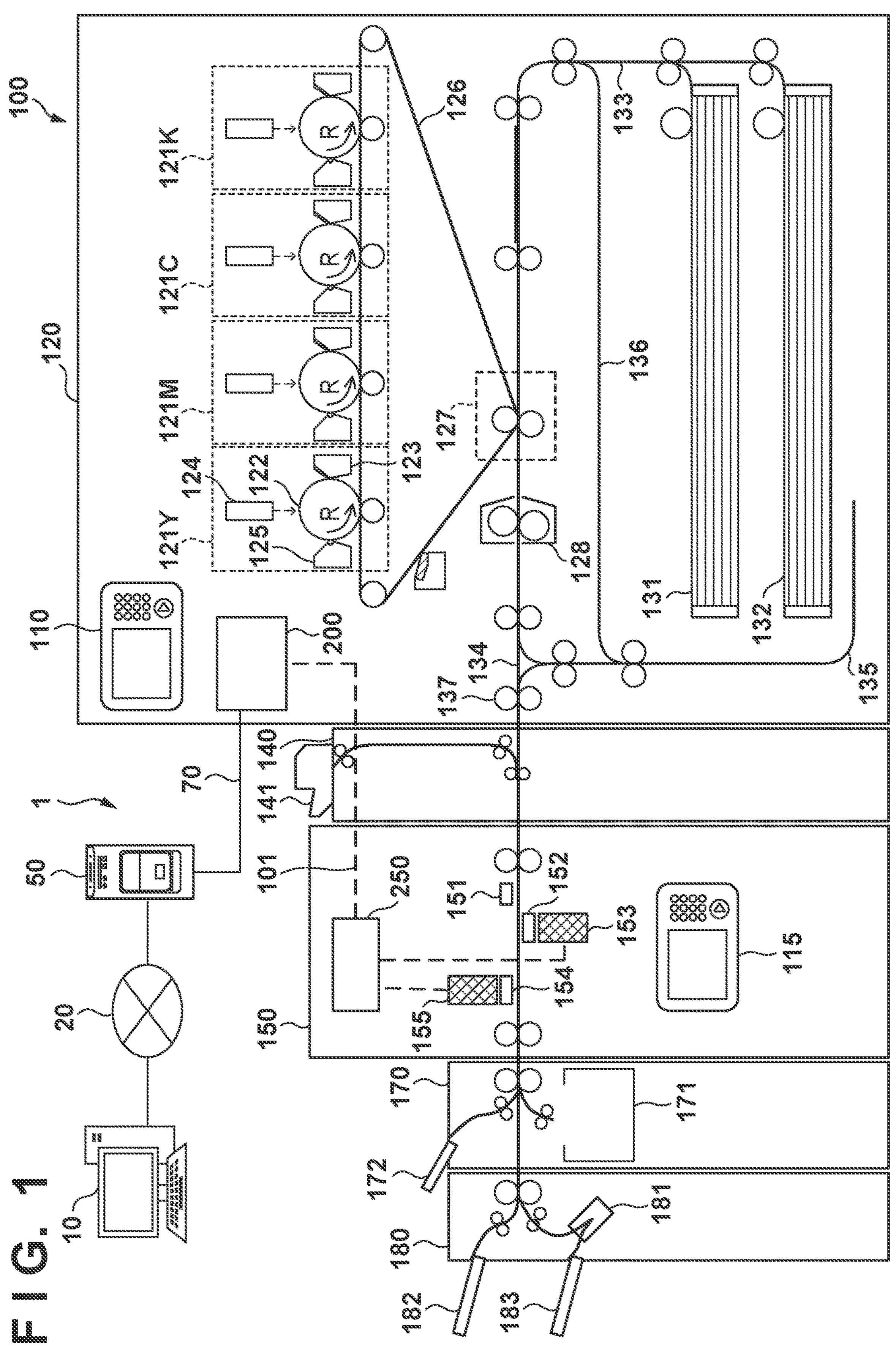
FIG. 1 is a schematic diagram illustrating an example of a configuration of an inspection system according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

1. System Overview

FIG. 1 is a schematic diagram illustrating a configuration of an inspection system 1 according to an embodiment. Referring to FIG. 1, the inspection system 1 includes a personal computer (PC) 10, an external controller 50, and an image-forming apparatus 100. The PC 10 is connected to the external controller 50 over a network 20. The network 20 may be a wired communication network or a wireless communication network. For example, the network 20 may include one or more of a local area network (LAN), a wide area network (WAN), and a public communication line. The external controller 50 is connected to the image-forming apparatus 100 by a connection line 70. The connection line 70 may be a communication network such as a LAN, or a dedicated line for connecting to the image-forming apparatus 100. As will be described below, the connection line 70 may include a line for communication and a line for image signals.

The PC 10 is a client terminal that issues print jobs to be executed by the image-forming apparatus 100. The PC 10 typically includes a communication interface (I/F), an input device, a display, storage, a memory, and a processor. One or more applications and a printer driver are installed in the PC 10. When printing is requested by a user, the printer driver generates page description language (PDL) data representing the image to be printed, and sends an instruction to print along with the generated PDL data to the external controller 50. The printer driver can display a print dialog in the display of the PC 10 in cooperation with a job control unit 60 of the external controller 50 (described below), and the user can designate various control parameters related to printing and inspection in the print dialog.

The external controller 50 accepts the instruction to print from the PC 10 and issues a print job to the image-forming apparatus 100. The external controller 50 may be referred to as an "image processing controller", a "digital front-end", a "print server", or the like. The configuration of the external controller 50 will be described in more detail below.

The image-forming apparatus 100 is an apparatus that forms an image on a sheet by executing a print job. In the present embodiment, the image-forming apparatus 100 has an inspection function for reading a sheet on which an image has been formed to generate read image data, and inspecting the quality of the print (the quality of the image on the sheet) based on the generated read image data. The image-forming apparatus 100 may therefore be referred to as an inspection apparatus.

2. Overall Configuration of Image-Forming Apparatus

As illustrated in FIG. 1, the image-forming apparatus 100 includes a printer unit 120, an inserter 140, a reader unit 150, a stacker 170, and a finisher 180. The printer unit 120, the inserter 140, the reader unit 150, the stacker 170, and the finisher 180 are connected to each other by signal lines such as communication cables. However, FIG. 1 illustrates only a signal line 101 between the printer unit 120 and the reader unit 150.

2-1. Printer Unit

The printer unit 120 is an image-forming unit that forms an image on a sheet. In the present embodiment, the printer unit 120 is a color laser printer capable of printing color images using the electrophotographic method. In another embodiment, the printer unit 120 may be another type of printer, such as a black-and-white laser printer or an ink jet printer. The printer unit 120 or the entire image-forming apparatus 100 may also be configured as a multifunction peripheral (MFP).

In the example in FIG. 1, the printer unit 120 includes an operation panel 110, image-forming units 121Y, 121M, 121C, and 121K, an intermediate transfer member 126, a transfer unit 127, a fixing unit 128, sheet feed trays 131 and 132, and a printer controller 200. The operation panel 110 provides the user with a user interface (UI) which is a combination of a display and input devices. The input devices can include, for example, one or more of buttons, a numerical keypad, a touch panel, and switches. The specific configuration of the printer controller 200 will be described in detail below.

The image-forming unit 121Y forms a yellow (Y) toner image on the intermediate transfer member 126. The image-forming unit 121M forms a magenta (M) toner image on the intermediate transfer member 126. The image-forming unit 121C forms a cyan (C) toner image on the intermediate transfer member 126. The image-forming unit 121K forms a black (K) toner image on the intermediate transfer member 126. The image-forming units 121Y, 121M, 121C, and 121K have the same configurations as each other, and thus the configuration of the image-forming unit 121Y will be described here as an example. The image-forming unit 121Y includes a photosensitive drum 122, a charger 123, an exposure unit 124, and a developer 125. The photosensitive drum 122 is a drum-shaped photosensitive member having a photosensitive layer on the surface thereof. The photosensitive drum 122 rotates about a drum shaft in the direction of an arrow R in the figure. The charger 123 uniformly charges the surface of the rotating photosensitive drum 122. The exposure unit 124 irradiates the photosensitive drum 122 with a laser beam according to image data (here, expressing a yellow image) input from the printer controller 200. The laser beam output from the exposure unit 124 scans the surface of the charged photosensitive drum 122 in a drum axis direction and thereby forms an electrostatic latent image on the surface of the photosensitive drum 122. The developer 125 develops the electrostatic latent image on the photosensitive drum 122 by supplying toner (which is yellow, in this case) to the surface of the photosensitive drum 122. A toner image is formed on the surface of the photosensitive drum 122 as a result. The yellow toner image formed on the surface of the photosensitive drum 122 in the image-forming unit 121Y is transferred to the intermediate transfer member 126. Furthermore, magenta, cyan, and black toner images formed on the surfaces of the respective photosensitive drums 122 in the image-forming units 121M, 121C, and 121K are transferred to the intermediate transfer member 126 in order in a manner that they are superimposed onto the yellow toner image. A full-color toner image is formed on the intermediate transfer member 126 as a result. The intermediate transfer member 126 is an endless belt member which rotates in what is the clockwise direction in the figure. The intermediate transfer member 126 conveys the full-color toner image to the position of the transfer unit 127 (a transfer nip).

Each of the sheet feed trays 131 and 132 holds a bundle of sheets. The sheet feed trays 131 and 132 may hold the same type of sheets, or may hold different types of sheets. Although FIG. 1 illustrates two sheet feed trays 131 and 132, the number of the sheet feed trays provided in the image-forming apparatus 100 is not limited to two. When a print job is executed, the sheets are picked up one by one from the sheet feed tray 131 or 132 by a feed mechanism and conveyed along a conveyance path 133.

The sheet picked up from the sheet feed tray 131 or 132 is conveyed to the transfer nip under the control of the printer controller 200, so as to coincide with the timing at which the toner image on the intermediate transfer member 126 reaches the transfer nip. The transfer unit 127 transfers the toner image carried by the intermediate transfer member 126 to the sheet at the transfer nip. The fixing unit 128 includes a heater and a pressure roller. The fixing unit 128 heats the toner image transferred onto the sheet using the heater, and pressurizes the toner image using the pressure roller. This melts the toner on the sheet and fixes the toner image onto the sheet. Although FIG. 1 illustrates an example in which the image-forming apparatus 100 includes one fixing unit 128, the image-forming apparatus 100 may further include a second fixing unit used to add gloss or improve the fixing performance, for example.

The conveyance path 133 branches into conveyance paths 134 and 135 downstream from the fixing unit 128. A sheet that has passed through the fixing unit 128 is first conveyed from the conveyance path 133 to the conveyance path 135. When a following end of the sheet has entered the conveyance path 135, the conveyance direction reverses and the sheet is discharged by discharge rollers 137 to the reader unit 150. When performing double-sided printing, the sheet which has entered the conveyance path 135 is conveyed to a conveyance path 136, and then returns from the conveyance path 136 to the conveyance path 133, passing through the transfer nip again having been flipped front to back. At the transfer nip, a toner image is formed on the back surface of the sheet by the transfer unit 127, and the toner image is fixed onto the sheet at the fixing unit 128. The sheet having images formed on both sides is then discharged to the inserter 140 by the discharge rollers 137.

2-2. Inserter

The inserter 140 includes an insert tray 141. Additional sheets to be inserted between the series of sheets on which images are formed by the printer unit 120 are placed on the insert tray 141. If an insert function is enabled in the print job, the inserter 140 causes the additional sheets supplied from the insert tray 141 to enter between the sheets sequentially received from the printer unit 120 at a designated timing. Although not illustrated in FIG. 1, the inserter 140 may include a controller that controls the insertion of such additional sheets. Alternatively, the insertion of the additional sheets may be controlled by the printer controller 200 or the reader controller 250. The inserter 140 discharges the sheets received from the printer unit 120 and the additional sheets to the reader unit 150.

2-3. Reader Unit

The reader unit 150 is a reading means that optically reads a sheet on which an image has been formed by the printer unit 120 to generate read image data representing a read image. In the example in FIG. 1, the reader unit 150 includes an operation panel 115, a sheet sensor 151, a flowing reading glass 152, a first reading sensor 153, a flowing reading glass 154, a second reading sensor 155, and a reader controller 250. The operation panel 115 provides the user with a user interface which is a combination of a display and input devices. The specific configuration of the reader controller 250 will be described in detail below.

The sheet sensor 151 detects the leading edge of each sheet received from the inserter 140. The sheet sensor 151 may be a photointerrupter, for example. The first reading sensor 153 generates read image data by optically reading the lower surface of the sheet passing above the flowing reading glass 152, and outputs the generated read image data to the reader controller 250. The second reading sensor 155 generates read image data by optically reading the upper surface of the sheet passing below the flowing reading glass 154, and outputs the generated read image data to the reader controller 250. The first reading sensor 153 and the second reading sensor 155 may be contact image sensors (CISs) or line scan cameras, for example. The timings at which the first reading sensor 153 and the second reading sensor 155 read the sheet can be controlled by the reader controller 250 based on the timing at which the sheet sensor 151 detects the leading edge of the sheet. The read image data output from each reading sensor to the reader controller 250 can be data indicating, for example, RGB signal values at each of pixel positions. The reader unit 150 discharges each sheet which has passed the flowing reading glass 154 to the stacker 170.

2-4. Stacker

The stacker 170 includes a stacking tray 171 and an escape tray 172. The stacking tray 171 is a large-capacity tray that can hold a large number of sheets. When the stacking tray 171 is designated as the sheet discharge destination in a print job, sheets received from the reader unit 150 are sequentially discharged to the stacking tray 171. The escape tray 172 is a tray to which a sheet determined to be defective as a result of the inspection in the reader unit 150 is discharged. Although not illustrated in FIG. 1, the stacker 170 may include a controller that controls the discharge of sheets into these trays. Alternatively, the discharge of the sheets may be controlled by the printer controller 200 or the reader controller 250. The stacker 170 may further include an inversion mechanism for flipping the sheet discharged into the stacking tray 171. If the stacking tray 171 is not designated as the sheet discharge destination, the stacker 170 discharges each sheet received (e.g., the sheets not detected as being defective) to the finisher 180.

2-5. Finisher

The finisher 180 includes a post-processing mechanism 181, a first discharge tray 182, and a second discharge tray 183. The post-processing mechanism 181 can perform post-processing such as stapling, punching, cutting, or binding (e.g., saddle-binding) on sheets or bundles of sheets received from the stacker 170. When the first discharge tray 182 is designated as the sheet discharge destination in a print job, sheets are sequentially discharged to the first discharge tray 182. When post-processing is designated to be executed, one or more sheets are first loaded into the post-processing mechanism 181, and after the designated post-processing is executed, the post-processed sheets or bundle of sheets are discharged to the second discharge tray 183. Although not illustrated in FIG. 1, the finisher 180 may include a controller that controls such post-processing and discharging. Alternatively, the post-processing and discharging may be controlled by the printer controller 200 or the reader controller 250. The finisher 180 may further include a lifting mechanism for raising and lowering the position of the first discharge tray 182 or the second discharge tray 183 according to the number of sheets to be discharged.

3. Example of Configuration of Control Functions 3-1. External Controller

FIG. 2 is a block diagram illustrating an example of the configuration of the external controller 50. Referring to FIG. 2, the external controller 50 includes a first communication I/F 51, a second communication I/F 52, a video I/F 53, a display 54, an input device 55, a central processing unit (CPU) 56, a memory 57, and a hard disk drive (HDD) 58. The first communication I/F 51, the second communication I/F 52, the video I/F 53, the display 54, the input device 55, the CPU 56, the memory 57, and the HDD 58 are connected to each other over a system bus 59.

The first communication I/F 51 is an interface for the external controller 50 to communicate with other devices (e.g., the PC 10) over the network 20. The second communication I/F 52 is an interface that mediates control communication between the external controller 50 and the image-forming apparatus 100. The video I/F 53 is an interface that mediates the communication of image data (e.g., the input image data of a print job) between the external controller 50 and the image-forming apparatus 100. The display 54 is a device capable of displaying images, video, and information. The input device 55 is a device capable of accepting user inputs. The input device 55 can include, for example, one or more of a keyboard, buttons, a touch panel, and switches. The CPU 56 is processing circuitry that controls the overall functions of the external controller 50 by executing computer programs stored in the memory 57 or the HDD 58. The memory 57 may be any combination of random access memory (RAM) and read-only memory (ROM), for example. The RAM provides a temporary storage region for operations to the CPU 56. The HDD 58 is a storage device capable of storing large amounts of data. The HDD 58 may store image data and various configuration data, for example, in addition to computer programs.

In the present embodiment, the CPU 56 functions as the job control unit 60. The job control unit 60 controls the acceptance of printing instructions, the issuance of print jobs to the image-forming apparatus 100, and the feedback of job execution results to the user. For example, when printing is instructed by the user, the job control unit 60 generates input image data in bitmap format (RIP data) by rasterizing the PDL data representing the image to be printed. The job control unit 60 may further execute image processing such as color conversion, tone correction, and binarization on the input image data. The job control unit 60 then outputs a print job including the generated input image data, along with control parameters that can be obtained via a UI such as a print dialog, to the image-forming apparatus 100.

Note that despite the descriptions given herein, the external controller 50 may be omitted from the configuration of the inspection system 1. If the inspection system 1 does not include the external controller 50, the functions of the job control unit 60 can be implemented in an integrated or distributed manner by one or more of the PC 10, the printer controller 200, and the reader controller 250.

3-2. Printer Controller

FIG. 3 is a block diagram illustrating an example of the configuration of the printer controller 200. Referring to FIG. 3, the printer controller 200 includes a communication I/F 201, a video I/F 202, a connection I/F 203, an operation I/F 204, a printer I/F 205, a CPU 206, a memory 207, and an HDD 208. The communication I/F 201, the video I/F 202, the connection I/F 203, the operation I/F 204, the printer I/F 205, the CPU 206, the memory 207, and the HDD 208 are connected to each other over a system bus 209.

The communication I/F 201 is an interface that mediates control communication between the printer controller 200 and the external controller 50. The video I/F 202 is an interface that mediates the communication of image data between the printer controller 200 and the external controller 50. The connection I/F 203 is an interface that connects the printer controller 200 to the signal line 101. The operation I/F 204 is an interface that connects the printer controller 200 to the display and input devices of the operation panel 110. The CPU 206 is processing circuitry that controls the overall functions of the printer controller 200 by executing computer programs stored in the memory 207 or the HDD 208. The memory 207 may be any combination of RAM and ROM, for example. The RAM provides a temporary storage region for operations to the CPU 206. The HDD 208 is a storage device capable of storing large amounts of data.

In the present embodiment, the CPU 206 functions as a printing control unit 210. When a print job is received through the communication I/F 201 (or the operation panel 110), the printing control unit 210 controls the printer unit 120 to form an image based on the input image data onto a sheet in accordance with the control parameters included in the print job. The printing control unit 210 may display the progress and execution results of the print job in the display of the operation panel 110 and report to the job control unit 60 of the external controller 50 through the communication I/F 201.

3-3. Reader Controller

FIG. 4 is a block diagram illustrating an example of the configuration of the reader controller 250. Referring to FIG. 4, the reader controller 250 includes image processing circuits 251 and 252, a connection I/F 253, an operation I/F 254, a CPU 256, and a memory 257. The image processing circuits 251 and 252, the connection I/F 253, the operation I/F 254, the CPU 256, and the memory 257 are connected to each other over a system bus 259.

The image processing circuit 251 executes image processing, such as analog-to-digital conversion (ADC), color conversion, and noise removal, on the read image data generated by the first reading sensor 153 reading the lower surface of the sheet. The image processing circuit 252 executes image processing, such as ADC, color conversion, and noise removal, on the read image data generated by the second reading sensor 155 reading the upper surface of the sheet. The connection I/F 253 is an interface that connects the reader controller 250 to the signal line 101. The operation I/F 254 is an interface that connects the reader controller 250 to the display and input device of the operation panel 115. The CPU 256 is processing circuitry that controls the overall functions of the reader controller 250 by executing computer programs stored in the memory 257. The memory 257 may be any combination of RAM and ROM, for example. The RAM provides a temporary storage region for operations to the CPU 256.

In the present embodiment, the CPU 256 functions as an inspection unit 260. When the inspection function is enabled in the print job, the inspection unit 260 causes the reader unit 150 to read the sheet on which the image was formed by the printer unit 120, and obtains the read image data. For single-sided printing, the inspection unit 260 obtains the read image data generated by the first reading sensor 153 for the lower surface of each sheet and processed by the image processing circuit 251. For double-sided printing, the inspection unit 260 further obtains the read image data generated by the second reading sensor 155 for the upper surface of each sheet and processed by the image processing circuit 252. In the following descriptions, the image to be inspected on each surface, which is expressed by the read image data, will be referred to as an "inspection target image".

The inspection unit 260 inspects each inspection target image by comparing the read image data with the reference image data corresponding to a reference image (base image) serving as the reference for the inspection. For example, the inspection unit 260 divides the inspection target image and the reference image into a plurality of segments, and compares partial images in the inspection target image and the reference image on a segment-by-segment basis. The inspection unit 260 may determine that there is no defect (the image satisfies a passing criterion) if an amount of misalignment between the contents of the partial images is no greater than a first threshold, and may determine that there is a defect (the image does not satisfy the passing criterion) if the amount of misalignment exceeds the first threshold. The inspection unit 260 may also determine that there is no defect if a stain or stripe which is not present in the reference image is present in the inspection target image but has a size no greater than a second threshold, and may determine that there is a defect if the size of the stain or stripe exceeds the second threshold. The inspection unit 260 may also perform optical character recognition (OCR) on the inspection target image and the reference image to determine whether there is a defect based on a comparison between the recognized characters. These techniques for comparison may be combined with each other in any way.

In the present embodiment, the inspection unit 260 inspects the inspection target image at an inspection level configured from among a plurality of inspection level candidates (called "candidate levels" hereinafter). As the inspection level increases (become stricter), smaller differences between the inspection target image and the reference image can be detected as printing defects. For example, assume that, out of an inspection level "A" and an inspection level "B", the inspection level "A" is higher. In this case, the determination threshold used for the inspection at the inspection level "A" (e.g., the first threshold and/or the second threshold described above) is lower than the determination threshold used for the inspection at the inspection level "B". The following descriptions assume that the inspection level is represented by an integer value, and that a larger numerical value corresponds to a higher inspection level. For example, the inspection level may be one of three candidate levels from level 1 to level 3, or one of five candidate levels from level 1 to level 5.

In one practical example, the inspection unit 260 may inspect whether or not the inspection target image contains a deficiency (also called a "printing defect") within each of ranges of one or more inspection areas registered in advance in association with the reference image. Regions not included in any inspection area may be excluded from the inspection. Even if there is a difference between the inspection target image and the reference image in a region excluded from the inspection, the difference is not detected as a printing defect. Additionally, when two or more inspection areas are registered in association with the reference image, the configuration may be such that different inspection levels can be configured for the two or more inspection areas. For example, when a photographic image is printed, a first inspection area may be set in a subject region, a second inspection area may be set in a background region, a relatively high inspection level may be configured for the first inspection area, and a relatively low inspection level may be configured for the second inspection area. The inspection areas may be designated by the user through the PC 10 or the operation panel 110, for example. The inspection unit 260 may also automatically designate a region recognized by analyzing the reference image (e.g., a face region or a person region recognized through image recognition) as the inspection area.

In the present embodiment, the reference image data may be generated in advance by reading the sheet on which a reference image has been formed by the printer unit 120 (called a "reference sheet" hereinafter), and stored in the memory 257. As an example, the reference sheet may be supplied from the insert tray 141 of the inserter 140 described above and read by the reader unit 150. The inspection unit 260 may generate the reference image data by performing processing such as resolution conversion, noise removal, overlaying, and averaging on the read image data of the reference sheet read by at least one of the first reading sensor 153 and the second reading sensor 155. As another example, the reference sheet may be read by a scanner (not illustrated in FIG. 1) that can be integrated with the printer unit 120. In another embodiment, the reference image data may be data generated based on the input image data (RIP data) received when forming the inspection target image on the sheet (i.e., without going through the processes of printing and reading).

In one practical example, printing defects detected by the inspection unit 260 may be classified into a plurality of defect types. The defect types may be two or more of the following, for example:

- stains (point-shaped soiling)
- stripes (linear soiling)
- misalignment (displacement of the printed image)
- color shift (shifts in the colors)
- density problems (densities that are too high or too low)
- deletion in image or text It is assumed that the user can designate which defect type should be inspected as an inspection-related parameter. In the following descriptions, the defect type to be inspected will be called an "inspection item". The inspection unit 260 can inspect the inspection target image using different inspection methods for different inspection items. For example, stains can be detected based on a simple pixel value comparison at relatively small segment sizes, whereas stripes can be detected based on both a pixel value comparison and an edge comparison at relatively large segment sizes. Additionally, the inspection unit 260 is capable of performing an inspection at different inspection levels for two or more defect types. For example, when some small stains are acceptable but stripes are not acceptable, a relatively low inspection level can be designated for stains and a relatively high inspection level can be designated for stripes.

The inspection unit 260 may cause the progress of the inspection and the inspection result to be displayed in the display of the operation panel 115 and report to the printer controller 200 (and furthermore, to the external controller 50) through the connection I/F 253. The inspection result includes whether a printing defect has been detected for each inspection target image, and also includes, for an inspection target image in which a printing defect has been detected, the defect type of the detected printing defect and position information indicating the position of the printing defect. The inspection unit 260 may record the inspection result in an inspection log stored in the memory 257 along with identification information of the inspection target image (e.g., a sheet number and a division between the front and the back) and the inspection date/time. The inspection unit 260 may control the stacker 170 to discharge defective sheets in which printing defects have been detected to the escape tray 172. Alternatively, defective sheets may be discharged to the same discharge destination as normal sheets, but the discharge position of the defective sheets may be shifted from the discharge position of normal sheets at the same discharge destination. Shifting the discharge position can reduce the burden on the user when extracting the defective sheets from the bundle of discharged sheets.

4. Example of Configuration of User Interface

This section will describe several examples of the configuration of inspection-related UIs provided to the user in the inspection system 1. These UIs may be provided through any desired display apparatus under the control of at least one of the printer driver of the PC 10, the external controller 50, the printer controller 200, and the reader controller 250 (control units).

4-1. Print Job Configuration

FIG. 5 is an explanatory diagram illustrating an example of a configuration of a job configuration screen 400 for configuring a print job to be executed in the inspection system 1. The job configuration screen 400 can be generated by the job control unit 60 of the external controller 50 and displayed in a display.

Referring to FIG. 5, the job configuration screen 400 includes five configuration fields 401, 402, 403, 405, and 406 for basic configurations of a print job, an inspection configuration section 410, and buttons 418 and 419. The configuration field 401 is a field that accepts an input of the number of printed copies. The configuration field 402 is a field that accepts designation of a color mode (e.g., full-color or black-and-white). The configuration field 403 is a field that accepts designation of a printing surface (e.g., single-sided or double-sided). The configuration field 405 is a field that accepts designation of a sheet feed tray. The configuration field 406 is a field that accepts designation of a discharge destination.

The inspection configuration section 410 includes a check box 411, a preview window 412, buttons 413 and 417, and configuration fields 415 and 416. The check box 411 is an object for enabling the user to designate whether to enable inspection for an image to be printed on a sheet. In the example in FIG. 5, the check box 411 is checked, and thus inspection is enabled. The other objects in the inspection configuration section 410 may be able to be manipulated only if the check box 411 is checked. The preview window 412 displays a preview of a representative reference image when a reference image to be used for the inspection is registered. In the example illustrated in FIG. 5, no reference image has been registered, and thus a preview of a reference image is not displayed in the preview window 412. The button 413 is a button for calling a reference image registration function of the reader unit 150. An example of a UI related to registration of reference images will be described below with reference to FIGS. 6 to 9. The configuration field 415 is a field that accepts designation of a discharge destination of defective sheets (e.g., the same as normal sheets, or the escape tray). The configuration field 416 is a field that accepts designation of side(s) to be inspected (e.g., only the front side, only the back side, or both sides). The designation of the printing surface in the configuration field 403 and the designation of side(s) to be inspected in the configuration field 416 need not necessarily be the same (i.e., only one side may be inspected when double-sided printing is performed, and both sides may be inspected when single-sided printing is performed). The button 417 is a button for calling an inspection-related advanced configuration function. An example of a UI for the inspection-related advanced configuration will be described below with reference to FIG. 10.

The button 418 is a button for canceling the issuing of the print job and closing the job configuration screen 400. The button 419 is a button for instructing the execution of the print job to be started. When the button 419 is operated by the user, the job control unit 60 issues a print job, including input image data and control parameters indicating the configurations accepted through the job configuration screen 400, to the image-forming apparatus 100. The printing control unit 210 of the printer controller 200 accepts the print job and executes the print job in accordance with the printing-related configurations. The printing control unit 210 also sends an inspection start instruction to the reader controller 250 along with the control parameters indicating the inspection-related configurations. The inspection unit 260 of the reader controller 250 executes the inspection according to the inspection-related configurations in response to the inspection start instruction. If the reference image required for the inspection has not yet been registered, the inspection unit 260 may notify the printing control unit 210 and the job control unit 60 of an error so that the execution of the print job does not start until a reference image is registered.

Although FIG. 5 illustrates an example in which the job configuration screen 400 includes the inspection configuration section 410, the inspection configuration section 410 may be provided as an inspection configuration screen independent of the job configuration screen 400 (e.g., that can be called from the job configuration screen 400). The inspection configuration section 410 or the inspection configuration screen may further include an object for accepting an instruction to print the reference image when there is a registered reference image (e.g., a field for inputting the number of printed copies of the reference image and a button for triggering the printing).

4-2. Registration of Reference Image

FIG. 6 is an explanatory diagram illustrating an example of a configuration of a reference image registration screen 430 for accepting registration of a reference image. The reference image registration screen 430 can be generated by the inspection unit 260 of the reader controller 250 and displayed in a display.

Referring to FIG. 6, the reference image registration screen 430 includes three configuration fields 431, 432, and 433, and buttons 435, 438, and 439. The configuration field 431 is a field that accepts an input of a number of reference images to be registered. For example, when inspecting printed images on both sides of N sheets (where N is a natural number), it is necessary to register a total of N×2 reference images. The configuration field 432 is a field that accepts an input of a number of repetitions of reads for the registration of a single reference image. For example, by compositing (e.g., overlaying or averaging) K read images generated by reading K sheets (where K is a natural number) onto which the same printed image has been printed, the inspection unit 260 can generate a single reference image corresponding to that printed image. The configuration field 433 is a field that accepts designation of a read surface (e.g., single-sided or double-sided) of the reference sheet. The button 435 is a button for calling a previously-registered reference image as a reference image for a new print job. The button 438 is a button for canceling the registration of the reference image and closing the reference image registration screen 430. The button 439 is a button for instructing the reading of the reference sheet to be started. When the button 439 is operated by the user, the inspection unit 260 controls the reader unit 150 to sequentially read reference sheets conveyed from the inserter 140 to generate read image data, and generates reference image data based on the read image data.

Through the display, the inspection unit 260 notifies the user of the progress of the reading while the reading of the reference sheets is in progress. Once the reading of the reference sheets is complete, the inspection unit 260 displays a confirmation screen in the display for the user to confirm the reference images to be registered.

Figure 7:
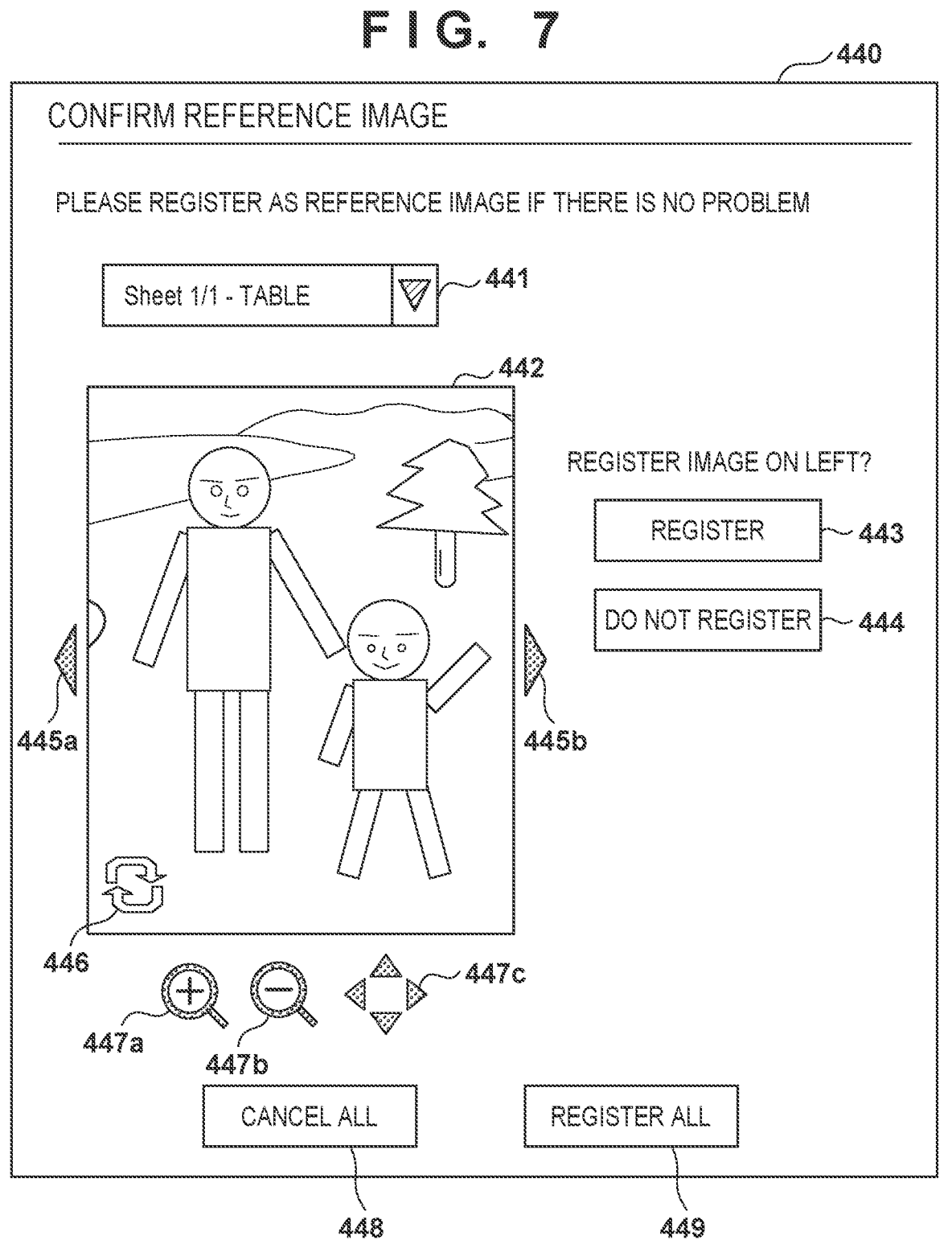

FIG. 7 is an explanatory diagram illustrating an example of a configuration of a reference image confirmation screen 440. Referring to FIG. 7, the reference image confirmation screen 440 includes a selection field 441, a preview window 442, buttons 443, 444, 448, and 449, and objects 445*a*, 445*b*, 446, 447*a*, 447*b*, and 447*c*.

The selection field 441 is a field through which a page of reference images to be confirmed can be switched. In the following descriptions, the term "page" is used to indicate a position identified by a combination of a sheet and a side (front/back) in a series of images (inspection target images or reference images). The preview window 442 is a window in which the preview of the reference image of the page selected in the selection field 441 is displayed. The objects 445*a* and 445*b* are buttons for moving the selected sheet forward or backward, and the object 446 is a button for flipping the side of the sheet selected. When the objects 445*a* and 445*b* or 446 are manipulated, the display of the preview of the reference image in the preview window 442 is switched along with the selection of the page in the selection field 441. The objects 447*a* and 447*b* are buttons for changing the display magnification of the preview in the preview window 442. The object 447*c* is a collection of buttons for moving the part displayed in the preview window 442 in respective four directions, namely up, down, left, and right. Although this section describes an example in which several UI objects are placed on the screen, each object may instead be implemented as a gesture operation made by the user (e.g., a flick, a pinch-in, a pinch-out, or a swipe).

The button 443 is a button for the user who has determined that there is no problem with the (unregistered) reference image displayed in the preview window 442 to instruct the registration of the reference image. When the button 443 is operated by the user, the inspection unit 260 registers the corresponding reference image in association with the page selected in the selection field 441. The button 444 is a button for the user who has determined that there is a problem with the reference image (e.g., due to the occurrence of a printing defect, missing parts of the image, or taking the wrong reference sheet) to cancel the registration of the reference image. When the button 444 is operated by the user, the inspection unit 260 can discard the corresponding reference image. The button 448 is a button for collectively canceling the registration of reference images generated by reading a series of reference sheets. The button 449 is a button for collectively instructing the registration of all reference images generated by reading a series of reference sheets.

Figure 8:
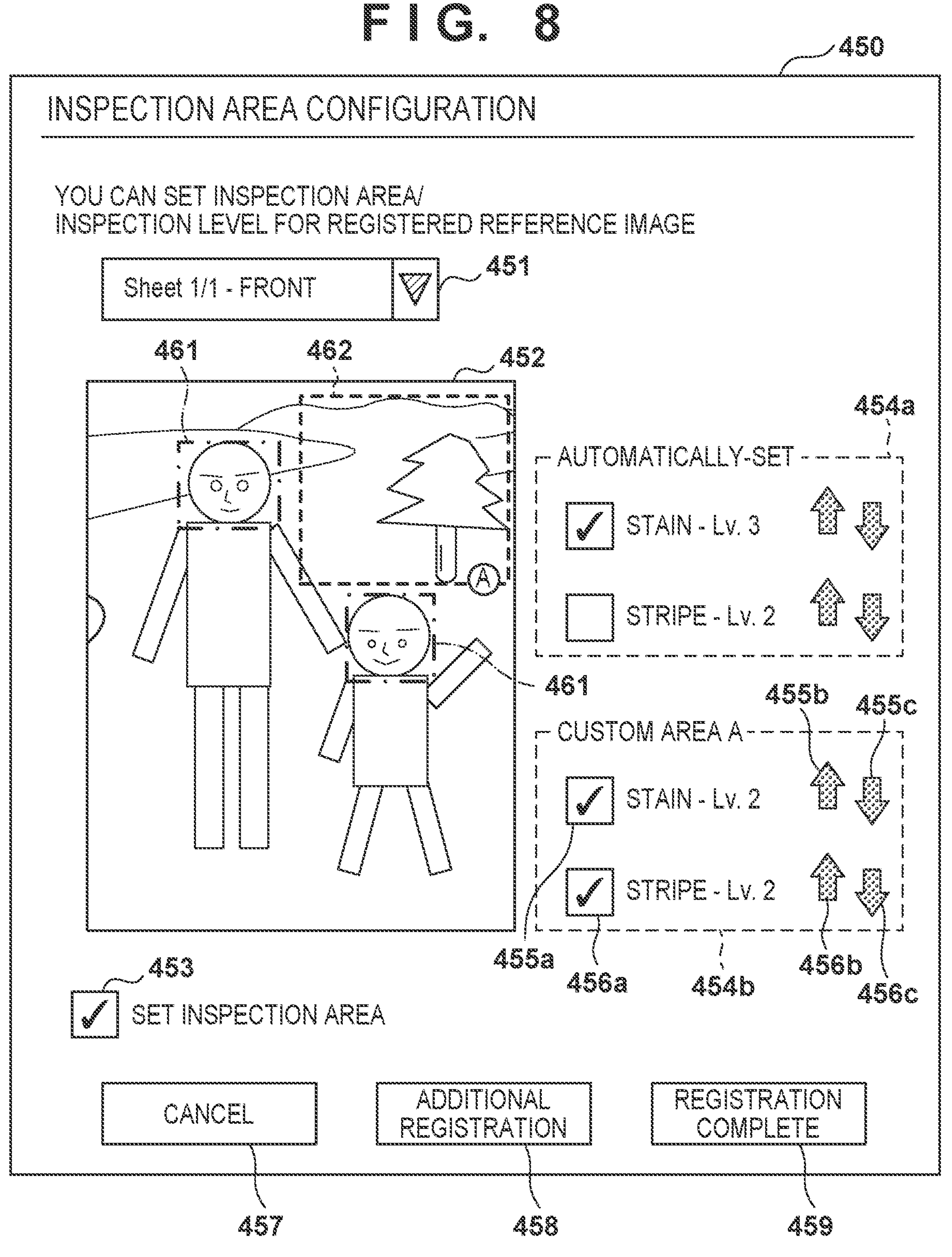
FIG. 8 is an explanatory diagram illustrating an example of a configuration of an inspection area configuration screen.

FIG. 8 is an explanatory diagram illustrating an example of a configuration of an inspection area configuration screen 450, which can be further displayed in the display when at least one reference image has been registered. Referring to FIG. 8, the inspection area configuration screen 450 includes a selection field 451, a preview window 452, a check box 453, level configuration sections 454*a* and 454*b*, and buttons 457, 458, and 459.

The selection field 451 is a field through which a page of reference images in which an inspection area is to be configured can be switched. The preview window 452 is a window in which the reference image registered in association with the page selected in the selection field 451 is displayed. The check box 453 is an object for enabling the user to designate whether to enable configuration of inspection areas for the reference image of the page selected in the selection field 451. When the check box 453 is unchecked, the inspection level can be configured for the entire reference image, rather than configuring inspection levels for individual inspection areas in the selected reference image. When the check box 453 is checked, inspection levels can be configured for individual inspection areas in the selected reference image.

The level configuration section 454*a* includes an object for accepting inspection level configurations for an inspection area configured automatically by the inspection unit 260. In the example in FIG. 8, two face regions recognized in the reference image are set as automatic inspection areas, and marks 461 indicating those face regions are overlaid on the preview window 452. The user can designate whether to enable configuration of such an automatic inspection area in advanced configurations (described below). The level configuration section 454*b* includes an object for accepting inspection level configurations for an inspection area configured by the user. In the example in FIG. 8, a designated region designated through a user operation (e.g., touching or dragging) in the preview window 452 is configured as a user-specific inspection area (a custom area A), and a mark 462 indicating the custom area A is overlaid on the preview window 452.

The configurations of the level configuration section 454*a* and the level configuration section 454*b* may be the same, and thus the level configuration section 454*b* will be described here as an example. The level configuration section 454*b* includes a check box 455*a*, objects 455*b* and 455*c*, a check box 456*a*, and objects 456*b* and 456*c*. The check box 455*a* is an object for enabling the user to designate whether to enable inspections for 'Stain', which is one of the inspection items. The objects 455*b* and 455*c* are buttons for changing the inspection level for 'Stain'. When the user wishes to perform a fine inspection for 'Stain' (wishes that even sheets containing only small stains are to be detected as defective sheets), the user checks the check box 455*a*, and operates the object 445*b* to raise the inspection level. Conversely, when the user wishes to perform only a rough inspection for stains, the user checks the check box 455*a*, and operates the object 445*c* to lower the inspection level. If the user does not wish to inspect for 'Stain', they uncheck the check box 455*a*. The check box 456*a* is an object for enabling the user to designate whether to enable inspections for 'Stripe', which is another one of the inspection items. The objects 456*b* and 456*c* are buttons for changing the inspection level for 'Stripe'. These inspection level configurations in the level configuration section 454*b* are applied to the custom area A.

The inspection unit 260 may make the color of the marks 461 in the preview window 452 and the color of the frame of the level configuration section 454*a* the same color (e.g., blue), and the color of the mark 462 and the frame of the level configuration section 454*b* the same color (e.g., green). This makes it easier for the user to understand to which inspection area the section configurations of each section are applied.

The button 457 is a button for canceling the configurations of inspection areas and returning to the previous screen. The button 458 is a button for transitioning to a screen for registering an additional reference image. The button 458 may be displayed in the inspection area configuration screen 450 when, for example, there is a page for which a selection has been made not to register a reference image in the reference image confirmation screen 440 in FIG. 7. When the button 458 is operated by the user, the inspection unit 260 stores the configurations of inspection areas and inspection levels accepted through the inspection area configuration screen 450 in the memory 257, and then displays an additional registration screen for registering an additional reference image in the display. A button 459 is a button for completing the registration of the reference images. When the button 459 is operated by the user, the inspection unit 260 stores the configurations of inspection areas and inspection levels in the memory 257, and closes the inspection area configuration screen 450.

Figure 9:
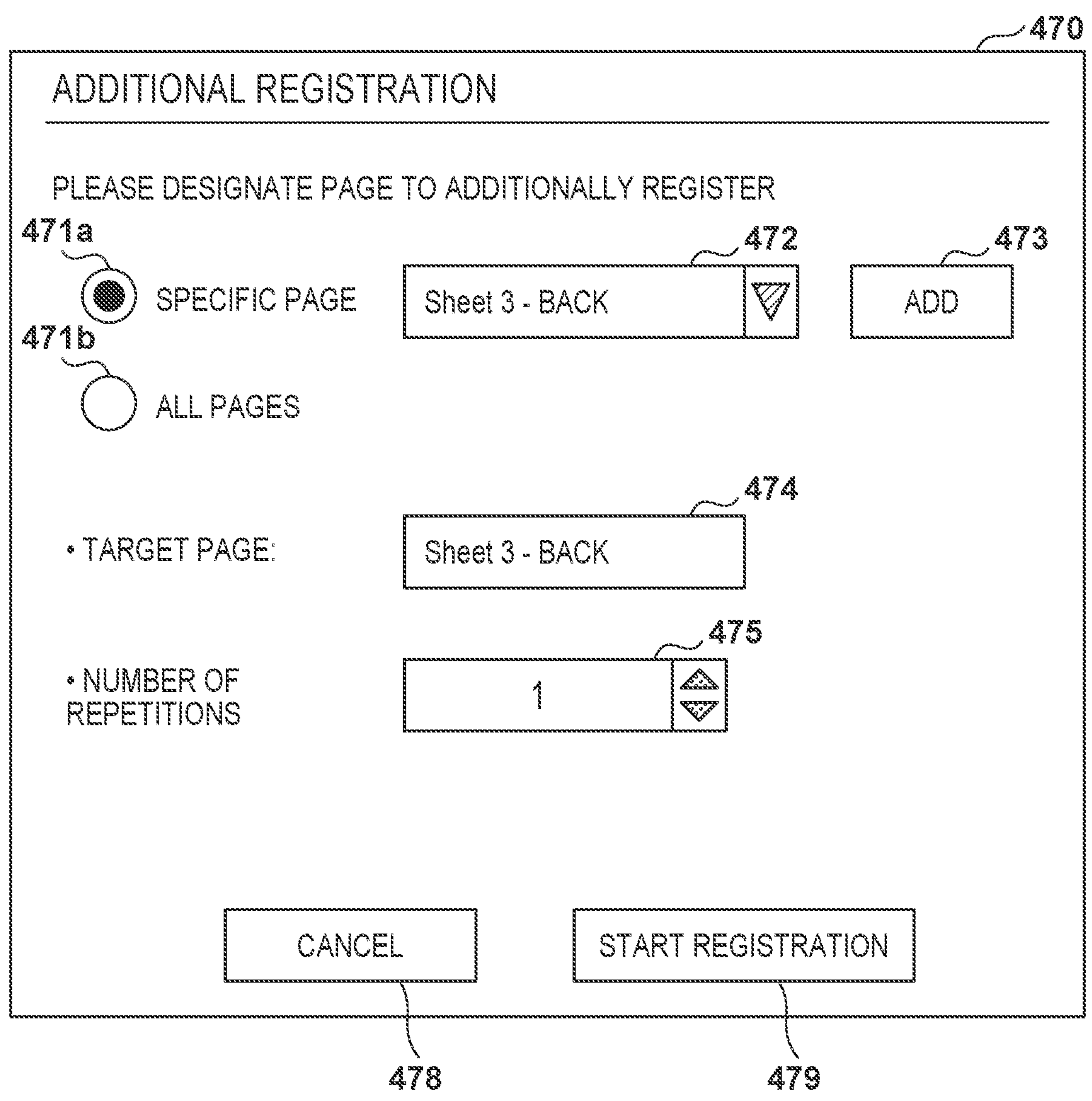
FIG. 9 is an explanatory diagram illustrating an example of a configuration of an additional registration screen.

FIG. 9 is an explanatory diagram illustrating an example of a configuration of an additional registration screen 470 for registering an additional reference image. Referring to FIG. 9, the additional registration screen 470 includes radio buttons 471*a* and 471*b*, configuration fields 472 and 475, a text field 474, and buttons 473, 478, and 479. The radio buttons 471*a* and 471*b* are objects for exclusively accepting whether to register an additional reference image only for a specific page or for all pages for which no reference image has not yet been registered. If the user registers an additional reference image only for a specific page, the user selects the radio button 471*a*, selects the intended page in the configuration field 472, and operates the button 473. The selected page is then added to a list of pages subject to the additional registration. The text field 474 is a field displaying the list of pages subject to the additional registration. If the user wishes to register additional reference images for all pages, they select the radio button 471*b*. The configuration field 475 is a field that accepts an input of a number of repetitions of reads for the additional registration of a single reference image. The button 478 is a button for canceling the registration of additional reference images and closing the additional registration screen 470. The button 479 is a button for instructing the reading of reference sheets for the additional registration to be started. When the button 479 is operated by the user, the inspection unit 260 controls the reader unit 150 to read reference sheets conveyed from the inserter 140 to generate read image data, and generates reference image data for the additional registration based on the read image data.

Through the display, the inspection unit 260 notifies the user of the progress of the reading while the reading of reference sheets is in progress. When the reading of reference sheets for the additional registration is complete, the inspection unit 260 displays a confirmation screen similar to that described with reference to FIG. 7 in the display.

In response to having read the reference sheets for initial or additional registration of reference images, the inspection unit 260 may send a request to print the registered reference images to the printing control unit 210 of the printer controller 200 or the job control unit 60 of the external controller 50.

4-3. Advanced Inspection Configuration

FIG. 10 is an explanatory diagram illustrating an example of a configuration of an advanced configuration screen 480 for advanced inspection configurations called from the job configuration screen 400 described with reference to FIG. 5 (or another menu screen). The advanced configuration screen 480 can be generated by the inspection unit 260 and displayed in a display, for example.

Referring to FIG. 10, the advanced configuration screen 480 includes check boxes 481*a*, 482*a*, and 483*a*, objects 481*b* and 481*c*, check boxes 484, 485, and 486, and buttons 488 and 489. The check boxes 481*a*, 482*a*, and 483*a* are objects for enabling the user to designate whether to enable inspections for 'Stain', 'Stripe', and 'Misalignment', which are candidates for inspection items. In the example in FIG. 10, the check boxes 481*a* and 482*a* are checked, and in this case, it will be possible to enable inspections for 'Stain' and 'Stripe' in the inspection area configuration screen 450 described with reference to FIG. 8. The objects 481*b* and 481*c* are buttons for changing the default inspection level for 'Stain'. Similar objects for changing the inspection levels for 'Stripe' and 'Misalignment' are also provided. The check box 484 is an object for enabling the user to designate whether to enable configuration of the automatic inspection area for reference images. The check box 485 is an object for enabling the user to designate whether to display a tentative inspection result at a candidate level other than the current inspection level in the event a defect is detected in the inspection. When the check box 485 is checked, the inspection unit 260 provides the user with a tentative inspection result at another candidate level, along with the inspection result at the current inspection level, through an inspection result screen (described in detail below). The check box 486 is an object for enabling the user to designate whether to discharge defective sheets that can be detected in the inspection to the escape tray 172 of the stacker 170, or to the same discharge destination as the normal sheets.

The button 488 is a button for canceling changes made to the advanced configurations and closing the advanced configuration screen 480. The button 489 is a button for completing the changes made to the advanced configurations. When the button 489 is operated by the user, the inspection unit 260 applies the changes made to the advanced configurations, which have been accepted through the advanced configuration screen 480, to the configurations stored in the memory 257, and closes the advanced configuration screen 480. The inspection-related configurations accepted through the advanced configuration screen 480 may be applied only to individual print jobs, or may be applied universally to a plurality of print jobs.

4-4. Display of Inspection Progress

When a print job for which inspection is enabled is executed, an inspection target image of the inspection is formed on a sheet by the printer unit 120, and the sheet is optically read by the reader unit 150. The inspection unit 260 inspects the inspection target image by comparing the read image data with the reference image data at the inspection level configured through the UIs described above, and generates the first inspection result. The external controller 50, the printer controller 200, or the reader controller 250 controls the display of the inspection result in a display. The following descriptions will assume that the inspection unit 260 functions as a control unit that controls the display of the inspection result, and that the inspection result is displayed in the display of the operation panel 115.

Figure 11:
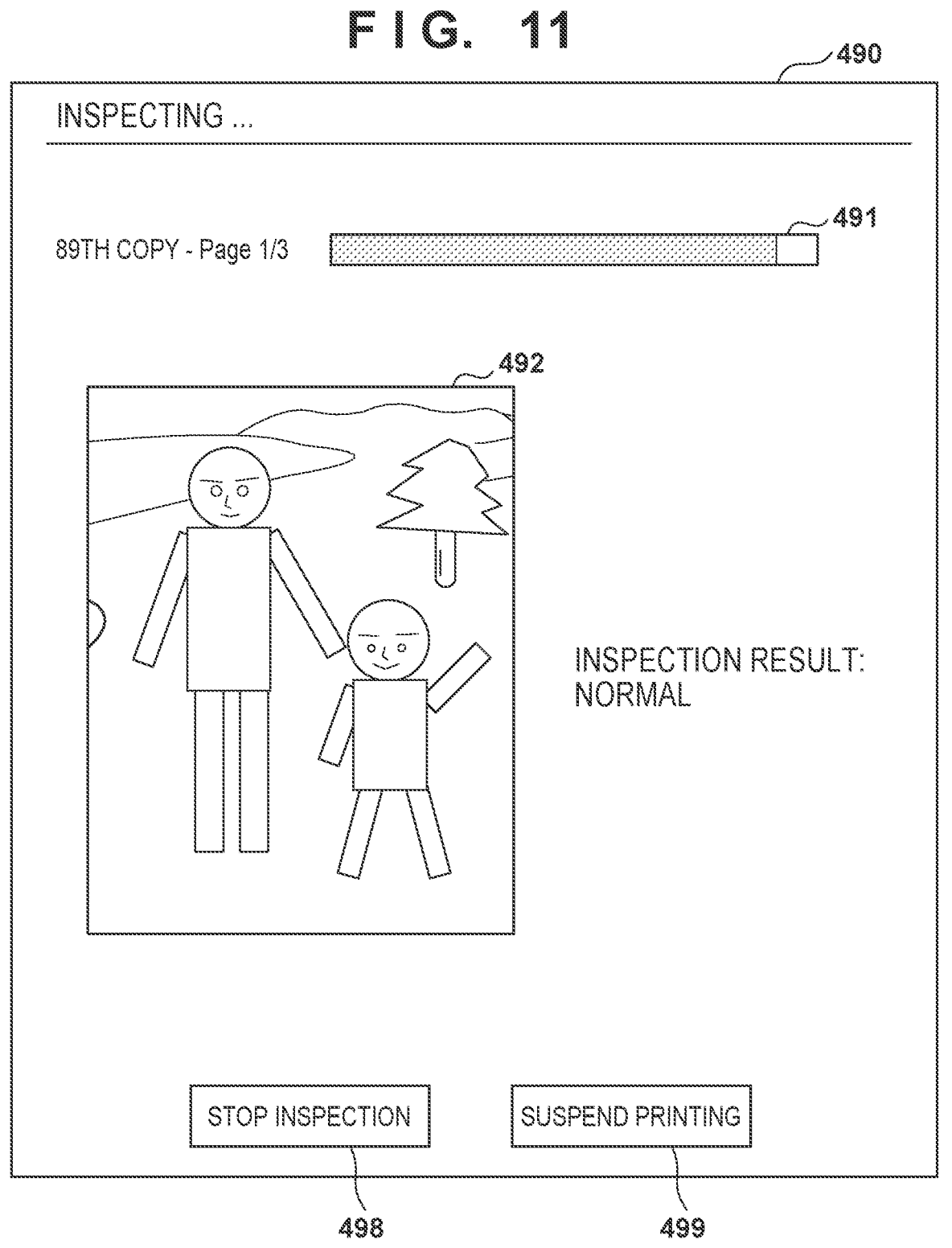

FIG. 11 is an explanatory diagram illustrating an example of a configuration of an inspection status screen 490 that can be displayed in the display while the inspection of a series of inspection target images is progressing. Referring to FIG. 11, the inspection status screen 490 includes a status indicator 491, an image window 492, and buttons 498 and 499. The status indicator 491 is an object that indicates what percentage of the inspection is complete with respect to the total number of inspection target images. The image window 492 is a window in which a reduced view of the latest inspection target image (or the corresponding reference image) for which the inspection has been completed is displayed. The button 498 is a button for stopping (skipping) the inspection for the subsequent inspection target images. When the button 498 is operated by the user, the inspection unit 260 controls the first reading sensor 153 and the second reading sensor 155 not to read the sheets that are conveyed from the inserter 140 thereafter. The button 499 is a button for suspending the execution of the print job. When the button 499 is operated by the user, the inspection unit 260 reports to the printer controller 200 that an instruction to suspend the job has been given. The printing control unit 210 of the printer controller 200 transfers this report to the job control unit 60 of the external controller 50 and stops driving the printer unit 120.

4-5. Reconfiguration of Inspection Level

In the present embodiment, when the first inspection result (i.e., the inspection result at the current inspection level) meets a predetermined condition, the inspection unit 260 obtains a second inspection result, resulting from inspecting the inspection target image at one or more candidate levels, among the plurality of candidate levels, that is different from the current inspection level. In the following descriptions, the current inspection level will be called a "first inspection level", and the one or more other candidate levels will be called "second inspection levels". The inspection unit 260 then controls the display apparatus to display the obtained second inspection results on the screen. As an example, the predetermined condition may include that the inspection target image has been determined to include a printing defect in the first inspection result. As another example, the predetermined condition may include that the inspection target image has been determined to include a printing defect multiple times in succession in the first inspection result. As yet another example, the predetermined condition may include that the number of times the inspection target image has been determined to include a printing defect in the first inspection result exceeds a predetermined threshold. As still another example, the predetermined condition may include that the inspection has reached a specific page designated in advance. The inspection unit 260 can reconfigure the inspection level from the first inspection level to any second inspection level based on a user input obtained in response to the display on the screen.

In response to the first inspection result meeting the predetermined condition, the inspection unit 260 obtains the second inspection results tentatively by comparing the inspection target image with the reference image at each candidate level. The inspection unit 260 then displays the first inspection result and the second inspection results in parallel in an inspection result screen 500 such as that illustrated in FIG. 12. Note that the first inspection result and the second inspection results are not necessarily displayed in parallel, and may, for example, may be displayed across a plurality of screens which can be transitioned from one another.

Figure 12:
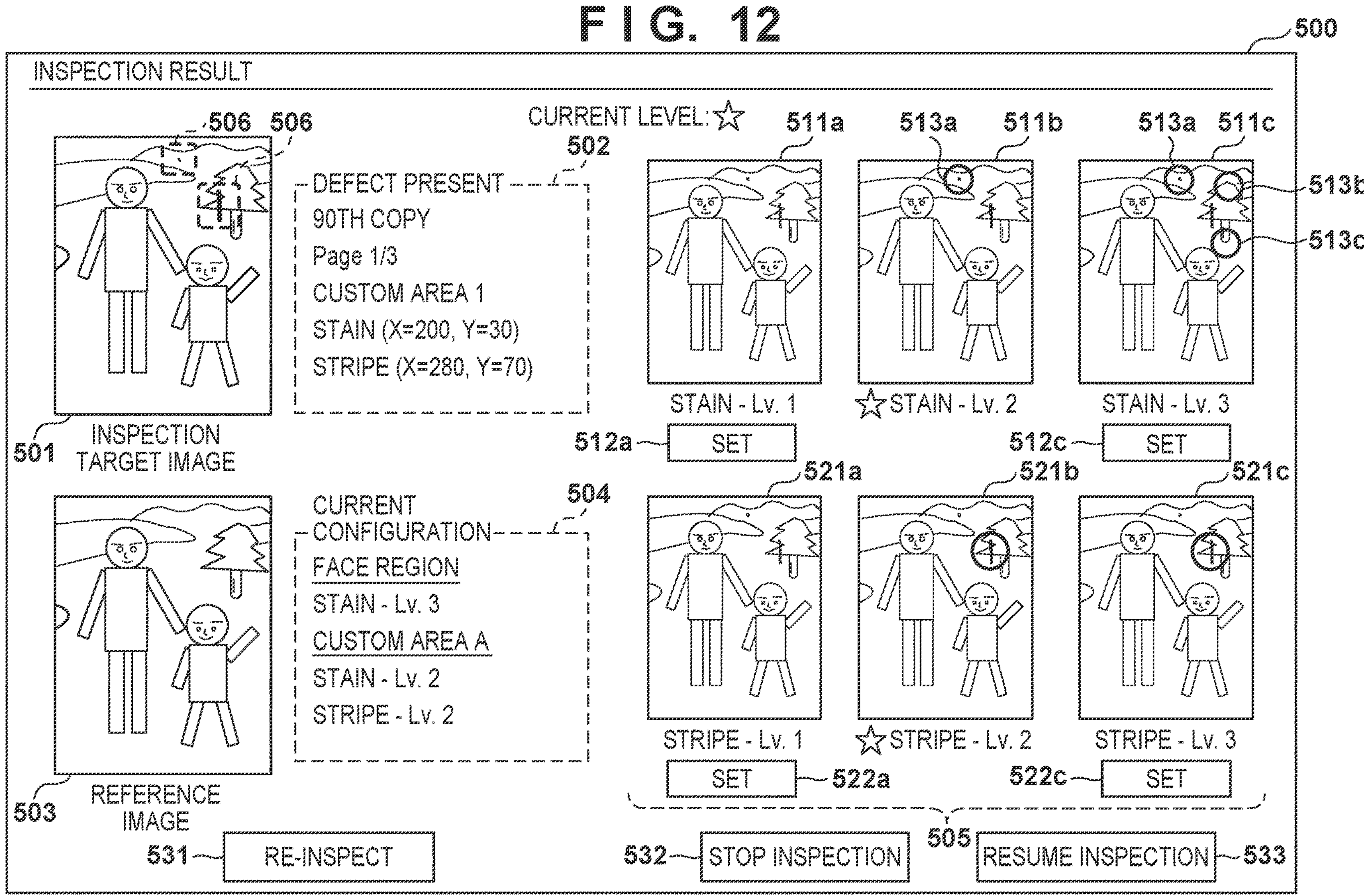
FIG. 12 is an explanatory diagram illustrating an example of a configuration of an inspection result screen.

FIG. 12 is an explanatory diagram illustrating an example of a configuration of the inspection result screen 500. Referring to FIG. 12, the inspection result screen 500 includes a target image window 501, an inspection result section 502, a reference image window 503, a current configuration section 504, a tentative results section 505, and buttons 531, 532, and 533.

The target image window 501 is a window in which a reduced view of the inspection target image including a detected printing defect is displayed. Marks 506 indicating the positions of one or more printing defects detected based on differences between the read image data and the reference image data are overlaid on the target image window 501. The inspection result section 502 is a section in which information about the first inspection result at the current inspection level is described. In the example in FIG. 12, identification information of the page on which the printing defect(s) has been detected, the name of the inspection area where the printing defect(s) has been detected, the defect type(s), and position information of the printing defect(s) are described in the inspection result section 502. The reference image window 503 is a window in which a reduced view of the reference image used in the inspection on the inspection target image is displayed. The current configuration section 504 is a section in which information pertaining to the current configurations of inspection areas and inspection levels associated with the reference image is described.

The tentative results section 505 is a section that displays the second inspection results, indicating a position of at least one printing defect that would be detected at each of the one or more candidate levels. In the example in FIG. 12, the tentative results section 505 includes preview windows 511*a*, 511*b*, and 511*c*, buttons 512*a* and 512*c*, preview windows 521*a*, 521*b*, and 521*c*, and buttons 522*a* and 522*c*.

The preview windows 511*a*, 511*b*, and 511*c* show the inspection results for the cases that the inspection target image are inspected for presence or absence of stains with inspection levels configured to "1", "2", and "3", respectively. Note that the inspection level "2" is equivalent to the current inspection level. No mark indicating a position of a printing defect is overlaid on the preview window 511*a*. This means that when the inspection level is reconfigured from "2" to "1", the stain detected at inspection level "2" will no longer be detected as a printing defect. A mark 513*a* is overlaid on the preview window 511*b*, which indicates the same stain as that detected in the first inspection result. Three marks 513*a*, 513*b*, and 513*c* indicating the positions of printing defects are overlaid on the preview window 511*c*. The marks 513*b* and 513*c* indicate stains that have not been detected in the first inspection result. However, the stain indicated by each mark may be an actual stain, or may be slight noise that is not actually a stain. In other words, when the inspection level is reconfigured from "2" to "3", more printing defects than those detected at inspection level "2" will be detected. If the user does not want the stain indicated by the mark 513*a* to be detected as a printing defect, he or she operates the button 512*a*. The inspection unit 260 then reconfigures the inspection level for the inspection item 'Stain' to the designated candidate level of "1". Alternatively, if the user wants the stains indicated by the marks 513*b* and 513*c* to be detected as printing defects too, he or she operates the button 512*c*. The inspection unit 260 then reconfigures the inspection level for the inspection item 'Stain' to the designated candidate level of "3".

The preview windows 521*a*, 521*b*, and 521*c* show the inspection results for the cases that the inspection target image are inspected for presence or absence of stripes with the inspection level configured as "1", "2", and "3", respectively. Note that the inspection level "2" is equivalent to the current inspection level. As in the case of stains, when the user operates the button 522*a*, the inspection unit 260 reconfigures the inspection level for the inspection item 'Stripe' to the designated candidate level of "1". Additionally, when the user operates the button 522*c*, the inspection unit 260 reconfigures the inspection level for the inspection item 'Stripe' to the designated candidate level of "3".

That is, in the present embodiment, the user input for reconfiguring the inspection level in the inspection result screen 500 designates one of the one or more candidate levels as the inspection level to be used after the reconfiguration. In one practical example, the user input for reconfiguring the inspection level may designate an arbitrary candidate level as an inspection level to be used after the reconfiguration for one of the two or more defect types. In this case, the same user input on the button 512*a*, 512*c*, 522*a*, or 522*c* illustrated in FIG. 12 may also serve as a designation of a defect type. In another practical example, the user input for reconfiguring the inspection level may designate an arbitrary candidate level as an inspection level to be used after the reconfiguration for one of the one or more inspection areas. In this case, the same user input may also serve as a designation of an inspection area. However, the present embodiment is not limited to these practical examples, and a user input that raises or lowers the inspection level commonly for a plurality of defect types may be employed. In addition, a user input that raises or lowers the inspection level commonly for a plurality of inspection areas may be employed.

The button 531 is a button for triggering re-inspection at an inspection level after the reconfiguration. The operation of the button 531 is enabled after at least one inspection level has been reconfigured in accordance with the user input. When the button 531 is operated by the user, the inspection unit 260 executes re-inspection at the inspection level after the reconfiguration for the inspection target image for which a printing defect has been detected. If a printing defect is not detected in the re-inspection, the inspection result for the inspection target image may be corrected from "defect" to "normal". In other words, the inspection result can be corrected immediately. The button 532 is a button for stopping the inspection for the subsequent inspection target images. The button 533 is a button for triggering an inspection to be resumed. When the button 533 is operated by the user, the inspection unit 260 resumes the inspection for the subsequent sheets. If the inspection level has been reconfigured, the inspection for the subsequent sheets is performed at the inspection level after the reconfiguration.

In one variation, the tentative results section 505 may selectively display only the second inspection results at a lower number of candidate levels, instead of exhaustively displaying the second inspection results at all candidate levels. The inspection unit 260 may select a second inspection level for which to display the second inspection result based on a user input, or in accordance with a predefined condition. For example, the inspection unit 260 may determine an upper limit number for second inspection levels to match the size of the available display region, and select a number of second inspection levels that does not exceed the determined upper limit number to generate the second inspection results. In particular, when the candidate levels span many levels, imposing a limit on the number of the second inspection levels in this manner makes it possible to shorten the time required for generating the inspection results and displaying the previews. This also makes it possible to use the display region efficiently and improve the visibility of the inspection results.

In another variation, the tentative results section 505 may display the second inspection results only for inspection items for which printing defects have been detected, instead of displaying the second inspection results for all of the active inspection items. For example, if inspections for stains and stripes are enabled, and a given inspection target image is detected as not containing a stain but containing a stripe, the inspection unit 260 may perform a tentative inspection at one or more second inspection levels only for stripes, and display the second inspection result in the display. At this time, the inspection unit 260 may accept a user input for reconfiguring the inspection level only for stripes. This makes it easy to optimize the inspection level for printing defects of the same type as those actually detected. This also reduces the time required to generate the inspection results and display the previews, and improves the visibility of the inspection results.

5. Flow of Processing

5-1. Reference Image Registration Processing

FIG. 13 is a flowchart illustrating an example of the flow of a reference image registration processing that can be executed by the inspection system 1 according to the present embodiment. The reference image registration processing illustrated in FIG. 13 may be started, for example, in response to the button 439 in the reference image registration screen 430 illustrated in FIG. 6 being operated.

Note that in the following descriptions, the processing steps will be abbreviated to "S".

First, in S101, the inspection unit 260 obtains configurations for reading reference sheets. The configurations obtained here can include, for example, the number of reference images to be registered, the number of repetitions of reads for registering a single reference image, and designation of read surface(s) of reference sheets.

Next, in S103, the inspection unit 260 monitors the sensor signal from the sheet sensor 151 and waits for the timing for reading a reference sheet. To simplify descriptions, it is assumed here that only one side of a reference sheet is to be read. The sequence moves to S105 when the timing for reading arrives.

In S105, the first reading sensor 153 optically reads the reference sheet. Next, in S107, the first reading sensor 153 generates read image data. The image processing circuit 251 executes required image processing (e.g., resolution conversion, noise removal, overlaying, and averaging) on the read image data.

Next, in S109, the inspection unit 260 determines whether all the reference sheets have been read. If there is a next sheet to be read, the sequence returns to S103. If all the reference sheets have been read, the sequence moves to S111.

In S111, the inspection unit 260 generates reference image data based on the read image data obtained through the iterations of S105 and S107, and displays the reference image confirmation screen 440, including a preview of a reference image, in the display. The user confirms the preview of the reference image for each page in the displayed reference image confirmation screen 440, and instructs that the reference image be registered if there are no problems.

The subsequent processing branches depending on the operation performed by the user in the reference image confirmation screen 440. If one or more reference images are discarded (S113—NO) and the user makes a selection for registering an additional reference image (S115—YES), the sequence returns to S101, and a reference sheet for the additional registration is read. If the registration of reference images for all pages is complete (S113—YES), or if the user has selected not to register an additional reference image (S115—NO), the sequence moves to S117.

In S117, the inspection unit 260 obtains the reference image data for which the registration has been accepted. Next, in S119, the inspection unit 260 displays the inspection area configuration screen 450 in the display. Then, if the user has made a selection to customize inspection areas/inspection levels (S119—YES), in S121, the inspection unit 260 accepts configurations of inspection areas and inspection levels for the reference image of each page. If the inspection areas/inspection levels are not to be customized, default or automatic configurations related to inspection may be used for the inspection.

5-2. Inspection Processing

FIG. 14 is a flowchart illustrating an example of a flow of the inspection processing that can be executed by the inspection system 1 according to the present embodiment. The inspection processing illustrated in FIG. 14 may be started when inspection is enabled in the job configuration screen 400 illustrated in FIG. 5 and the execution of a print job has been triggered, for example.

First, in S201, the inspection unit 260 obtains inspection-related configurations. The configurations obtained here can include, for example, a discharge destination for defective sheets, designation of side(s) of sheets to be inspected, inspection items, inspection areas, inspection levels, and whether to display inspection results for candidate levels other than the inspection level in the event that a defect is detected. Then, in S203, the inspection unit 260 obtains the registered reference image data.

Next, in S205, the inspection unit 260 monitors the sensor signal from the sheet sensor 151 and waits for the timing for reading a sheet to be inspected. To simplify descriptions, it is assumed here that only one side of each sheet is to be read. The sequence moves to S207 when the timing for reading arrives.

In S207, the first reading sensor 153 optically reads the sheet conveyed from the inserter 140. Next, in S209, the first reading sensor 153 generates read image data. The image processing circuit 251 executes required image processing on the read image data.

Next, in S211, the inspection unit 260 inspects the inspection target image by comparing the inspection target image expressed by the read image data with the reference image in accordance with the configurations obtained in S201. For example, the inspection unit 260 determines whether there is a printing defect based on differences between the read image data and the reference image data within each of one or more inspection areas registered in advance in association with the reference image.

Next, in S213, the inspection unit 260 determines whether a printing defect has been detected in the inspection target image. For example, a printing defect can be detected in the inspection target image when a difference exceeding a threshold corresponding to an inspection level configured in advance is present for the defect type for which the inspection is enabled (the inspection item). If a printing defect has been detected, the sequence moves to S220. Meanwhile, if a printing defect has not been detected, the inspection target image is determined to be normal, and the sequence moves to S215.

In S215, the inspection unit 260 updates the display of the inspection progress. For example, the inspection unit 260 causes the inspection status screen 490 described with reference to FIG. 11 to be displayed in the display, and the latest inspection results are reflected in the indicators and messages on the screen each time the inspection is completed for a single inspection target image. The sequence then moves to S233.

In S220, the inspection unit 260 executes the inspection result display processing to display the inspection result screen 500, which displays the first inspection result (indicating a printing defect) at the current inspection level and the second inspection results at one or more candidate levels, in the display. The specific flow of the inspection result display processing executed here will be described below. The inspection unit 260 can reconfigure at least one inspection level based on user inputs obtained through the inspection result screen 500.

The processing that follows thereafter branches depending on whether the user has instructed the inspection target image to be re-inspected. If the user has instructed re-inspection, the sequence returns to S211, where the inspection target image is re-inspected at the inspection level after the reconfiguration. If a re-inspection has not been instructed, the sequence moves to S233.

In S233, the inspection unit 260 discharges the sheet to the discharge destination according to the inspection result. For example, a sheet in which a printing defect has not been detected as a result of the inspection is discharged to the discharge destination for normal sheets. A sheet in which a printing defect has been detected is discharged to the discharge destination for defective sheets.

Next, in S235, the inspection unit 260 determines whether the inspection is complete for all the sheets. If there is a next sheet to be inspected, the sequence returns to S205. If the inspection is complete for all the sheets, the inspection processing illustrated in FIG. 14 ends.

5-3. Inspection Result Display Processing

FIG. 15 is a flowchart illustrating an example of a detailed flow of the inspection result display processing that can be executed in S220 of FIG. 14.

Referring to FIG. 15, first, in S221, the inspection unit 260 obtains the first inspection result based on the current inspection level. The first inspection result can include, for example, the defect type and position information for each detected printing defect.

Next, in S222, the inspection unit 260 executes tentative inspection at each of one or more candidate levels different from the current inspection level, and obtains corresponding second inspection results. The second inspection results, too, can include the defect type and position information for each detected printing defect.

Next, in S223, the inspection unit 260 displays the inspection result screen 500, which shows the first inspection result and the second inspection results, in the display. For example, based on the first inspection result, a mark indicating the position of the printing defect detected at the current inspection level is overlaid on the reduced view of the inspection target image in the inspection result screen 500. Likewise, based on the second inspection results, a mark indicating the position of the printing defect detected at each candidate level is overlaid on the reduced view of the inspection target image.

In S224, the inspection unit 260 waits for a user input instructing the inspection level to be reconfigured. If a user input instructing the inspection level to be reconfigured is accepted, in S225, the inspection unit 260 reconfigures the inspection level according to the user input. For example, the inspection unit 260 reconfigures the inspection level for the designated inspection item to the designated candidate level.

In S226, when a user input instructing the inspection to be resumed or re-inspection to be performed is accepted through the inspection result screen 500, the inspection unit 260 ends the display of the inspection results. The processing then moves to S231 in FIG. 14, where the inspection target image is re-inspected or a subsequent sheet is inspected.

6. CONCLUSION

Thus far, various embodiments, practical examples, and variations of the technology according to the present disclosure have been described with reference to FIGS. 1 to 15. According to the embodiment described above, a reading unit of an inspection system optically reads a sheet on which a target image is formed to generate read image data. An inspection unit inspects the target image by comparing the read image data with a reference image data at an inspection level configured from among a plurality of candidate levels to generate a first inspection result. In a case where the first inspection result meets a predetermined condition, a control unit obtains a second inspection result, which results from inspecting the target image at one or more candidate levels that are different from the inspection level from among the plurality of candidate levels. The control unit then causes the obtained second inspection result to be displayed on a screen, and reconfigures the inspection level based on a user input obtained thereafter. Accordingly, the user can easily grasp how the inspection level should be changed based on visual information in the screen in which the inspection results are displayed, and give the inspection system appropriate instructions for reconfiguring the inspection level. This improves the usability at the time of configuring an inspection level for inspecting an image on a sheet.

In the embodiment described above, the predetermined condition includes that the target image has been determined to include a printing defect. Accordingly, when an undesirable inspection result is output, the inspection level can be optimized quickly, which improves the usability, reduces errors in the detection of printing defects, and improves the productivity of the inspection.

In the embodiment described above, the first inspection result at the current inspection level and the second inspection result at the one or more candidate levels can be displayed in parallel in the screen. This makes it possible for the user to intuitively grasp how printing defects will increase or decrease when the inspection level is reconfigured by comparing the two inspection results. This further improves the usability.

In the embodiment described above, the user input for reconfiguring the inspection level can designate one of the one or more candidate levels as the inspection level to be used after the reconfiguration. In one practical example, the user input can designate the inspection level to be used after the reconfiguration for one of the two or more defect types. In this case, the inspection level can be flexibly adjusted for each defect type according to the purpose of the printed product. In one practical example, the user input can designate the inspection level to be used after the reconfiguration for a specific inspection area registered in association with the reference image. In this case, a limited part of importance in the target image can be focused on and fine adjustments of the inspection level can be accepted for it, which further improves the usability.

Note that the embodiments, practical examples, and variations described in the present specification may be combined with each other in any way.

7. OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of priority from Japanese Patent Application No. 2023-033072, filed on Mar. 3, 2023 which is hereby incorporated by reference herein in its entirety.

What is claimed is:

1. An inspection system comprising:

a reading unit configured to read a sheet, on which a target image is formed, to generate read image data;

an inspection unit configured to inspect the target image by comparing the read image data with a reference image data at an inspection level among a plurality of candidate inspection levels to generate a first inspection result; and a control unit configured to cause a display apparatus to display the first inspection result, wherein, in a case where the first inspection result meets a predetermined condition, the control unit is configured to:

cause the display apparatus to display the first inspection result and to display a second inspection result, the second inspection result being obtained by inspecting the target image at one or more candidate inspection levels, that are different from the inspection level, from among the plurality of candidate inspection levels, and wherein the control unit is configured to select the one or more candidate inspection levels from the plurality of candidate inspection levels such that a number of the one or more candidate inspection levels does not exceed an upper limit number determined based on a size of an available display region.

2. The inspection system according to claim 1, wherein the control unit is configured to reconfigure the inspection level when one of the one or more candidate inspection levels is selected.

3. The inspection system according to claim 1, wherein the predetermined condition includes that the target image has been determined to include a printing defect.

4. The inspection system according to claim 1, wherein the control unit is configured to control the display apparatus to display the first inspection result and the second inspection result in parallel on the screen.

5. The inspection system according to claim 1, wherein the inspection unit is configured to detect a printing defect included in the target image based on a difference between the read image data and the reference image data, the first inspection result indicates a position of each printing defect when at least one printing defect has been detected at the inspection level, and the second inspection result indicates a position of each printing defect when at least one printing defect has been detected at each of the one or more candidate inspection levels.

6. The inspection system according to claim 1, wherein the user input designates one of the one or more candidate inspection levels as an inspection level after reconfiguration.

7. The inspection system according to claim 1, wherein the inspection unit is capable of performing an inspection at different inspection levels for two or more defect types, and the user input designates any candidate inspection level as an inspection level after reconfiguration for one of the two or more defect types.

8. The inspection system according to claim 7, wherein the inspection unit is configured to obtain the second inspection result by tentatively inspecting the target image at the one or more candidate inspection levels that are different from the inspection level for a defect type of a printing defect detected in the target image.

9. The inspection system according to claim 1, wherein the inspection unit is configured to inspect whether the target image includes a printing defect or not within each of one or more inspection areas registered in association with a reference image.

10. The inspection system according to claim 9, wherein the user input designates any candidate inspection level as an inspection level after reconfiguration for one of the one or more inspection areas registered in association with the reference image.

11. The inspection system according to claim 1, wherein the inspection unit is configured to perform re-inspection of the target image after the inspection level is reconfigured by the control unit in accordance with the user input.

12. The inspection system according to claim 1, wherein the reference image data is generated in advance by reading a sheet on which a given reference image is formed or generated based on input image data accepted when forming the target image on a sheet.

13. The inspection system according to claim 1, wherein the inspection system further includes:

an image-forming unit configured to form the target image on the sheet.

* * * * *